United States Patent
Oka et al.

(10) Patent No.: US 9,030,392 B2
(45) Date of Patent: May 12, 2015

(54) DISPLAY DEVICE

(71) Applicant: Japan Display Inc., Tokyo (JP)

(72) Inventors: Shinichiro Oka, Hitachi (JP); Tomohiko Naganuma, Mobara (JP); Tatsuya Sugita, Takahagi (JP); Shinichi Komura, Mobara (JP)

(73) Assignee: Japan Display Inc., Tokyo (JP)

( * ) Notice: Subject to any disclaimer, the term of this patent is extended or adjusted under 35 U.S.C. 154(b) by 125 days.

(21) Appl. No.: 13/771,304

(22) Filed: Feb. 20, 2013

(65) Prior Publication Data

US 2013/0215001 A1  Aug. 22, 2013

(30) Foreign Application Priority Data

Feb. 20, 2012  (JP) ................. 2012-033656

(51) Int. Cl.
*G09G 3/36*   (2006.01)
*G09G 5/00*   (2006.01)
(Continued)

(52) U.S. Cl.
CPC ............... *G09G 3/36* (2013.01); *G02F 1/1347* (2013.01); *G02B 27/2214* (2013.01); *H04N 13/0404* (2013.01); *H04N 13/0447* (2013.01); *H04N 13/0452* (2013.01);
(Continued)

(58) Field of Classification Search
CPC . G09G 3/3648; G09G 3/3688; G09G 3/3611; G09G 3/3655; H04N 13/0404; H04N 13/00; H04N 13/04; H04N 13/0402; H04N 13/0409; H04N 13/0044; G02B 3/005; G02F 1/133526
USPC .......................................... 345/87, 6; 349/15
See application file for complete search history.

(56) References Cited

U.S. PATENT DOCUMENTS

2006/0145976 A1\* 7/2006 Tsai et al. ........................ 345/87
2006/0203338 A1\* 9/2006 Pezzaniti ....................... 359/465
(Continued)

FOREIGN PATENT DOCUMENTS

JP   2003-186036   7/2003
JP   2010-224191   10/2010
(Continued)

OTHER PUBLICATIONS

Ayako Takagi et al., 30.3: Autostereoscopic Partial 2-D/3-D Switchable Display Using Liquid-Crystal Gradient Index Lens, SID 10 Digest, pp. 436-439.
(Continued)

*Primary Examiner* — Aneeta Yodichkas
(74) *Attorney, Agent, or Firm* — Lowe Hauptman & Ham, LLP

(57) ABSTRACT

A display device is provided with: a first display panel for displaying an image; and a second display panel for forming a parallax by controlling a refractive index in a form of cylindrical lenses that run in a first direction and are aligned in a second direction, wherein the second display panel is provided with a first substrate having a first electrode and a second substrate having second electrodes, the first substrate and the second substrate face each other with a liquid crystal layer in between so as to provide a liquid crystal display panel, and a thickness of the liquid crystal layer is equal to or smaller than such a thickness that makes a rotational angle in a direction of a deflection angle of liquid crystal directors in a center portion of the liquid crystal layer in the direction of the thickness be 90° during three-dimensional display.

8 Claims, 20 Drawing Sheets

(51) Int. Cl.
  *G02F 1/133*    (2006.01)
  *G02F 1/1347*   (2006.01)
  *H04N 13/04*    (2006.01)
  G02B 27/22      (2006.01)
  G02F 1/1343     (2006.01)
  G02F 1/29       (2006.01)

(52) U.S. Cl.
  CPC .............. *G02F 2001/134381* (2013.01); *G02F 2001/294* (2013.01); *G02F 2203/28* (2013.01)

(56) References Cited

U.S. PATENT DOCUMENTS

| | | |
|---|---|---|
| 2010/0238276 A1 | 9/2010 | Takagi et al. |
| 2010/0238277 A1 | 9/2010 | Takahashi et al. |
| 2012/0069255 A1 | 3/2012 | Takagi et al. |
| 2012/0120331 A1 | 5/2012 | Oka et al. |
| 2012/0268481 A1 | 10/2012 | Niioka et al. |
| 2013/0038811 A1* | 2/2013 | Sugita et al. ................ 349/61 |
| 2013/0258219 A1 | 10/2013 | Takagi et al. |

FOREIGN PATENT DOCUMENTS

| | | |
|---|---|---|
| KR | 10-2007-0082109 | 8/2007 |
| KR | 10-2011-0107405 | 9/2011 |
| TW | 201232050 | 8/2012 |
| TW | 201305606 | 2/2013 |

OTHER PUBLICATIONS

Office Action in corresponding Taiwan Patent Application No. 10215891, mailed Jul. 24, 2014, with English translation thereof.

Office Action in corresponding Korean Application No. 10-2013-17996, mailed Jan. 28, 2014, with English translation.

Communication issued in connection with corresponding Korean Patent Application No. 10-2013-17996, mailed Aug. 27, 2014, with English translation thereof.

* cited by examiner

FIG.9

| thickness of liquid crystal layer | applied voltage | | |
|---|---|---|---|
| | 0V | 6V | 10V |
| 50 μm or less | no defects in alignment | no defects in alignment | no defects in alignment |
| 50 μm or more | no defects in alignment | some defects in alignment | some defects in alignment |

DISPLAY DEVICE

CROSS-REFERENCE TO RELATED APPLICATION

The present application claims priority over Japanese Patent Application JP2012-033656 filed on Feb. 20, 2012, the contents of which are hereby incorporated into this application by reference.

BACKGROUND OF THE INVENTION (1) Field of the Invention

The present invention relates to a display device, and in particular, to a liquid crystal lens provided on the display side of a display panel.

(2) Description of the Related Art

In recent years, display devices where a liquid crystal panel having lens effects (hereinafter referred to as liquid crystal lens) is provided on the display side of a liquid crystal display panel or an organic EL display panel so that a two-dimensional display (2-D display) and a three-dimensional display (3-D display) can be switched have been known. Such display devices have such a structure that the image for the right eye displayed on the display panel and the image for the left eye are separately viewed by the left and right eyes of the viewer due to the lens effects of the liquid crystal lens.

Such display devices where the 2-D display and the 3-D display can be switched include, for example, three-dimensional display devices as in JP 2010-224191A. The three-dimensional display device in JP 2010-224191A has in its structure a display panel for displaying an image, a birefringent lens provided on the display side of the display panel, and a liquid crystal lens provided between the display panel and the birefringent lens. In the liquid crystal lens, two electrodes in comb form are provided on each of the pair of transparent substrates that are provided so as to face each other with a liquid crystal layer in between. Furthermore, the two electrodes in comb form are formed on each transparent substrate so as to provide such a structure that the two electrodes in comb form alternate within the display region.

The liquid crystal lens in JP 2010-224191A particularly has such a structure that different voltages or the same voltage is applied to the two electrodes in comb form, and this structure makes it possible to switch the display between a 2-D display and a 3-D display and to switch the parallax numbers at the time of 3-D display by controlling the voltage applied to each electrode in comb form. That is to say, in the three-dimensional display device in JP 2010-224191A, a refractive index distributing type (GRIN: gradient index) lens having teeth of odd numbers of the electrode in comb form as end portions is formed in the case where a first voltage is applied to the teeth of the even numbers of the electrode in comb form and the electrode on the transparent substrate that is provided so as to face the electrode in comb form with a liquid crystal layer in between, and at the same time, a second voltage is applied to the teeth of the odd numbers of the electrode in comb form. In addition, a GRIN lens having each tooth of the electrodes in comb form as an end portion is formed in the case where a first voltage is applied to the teeth of even numbers of the electrode in comb form and the teeth of odd numbers of the electrode in comb form, and at the same time, a second voltage is applied to the electrode on the transparent substrate that is provided so as to face this electrode in comb form with a liquid crystal layer in between.

"Autostereoscopic Partial 2-D/3-D Switchable Display Using Liquid-Crystal Gradient Index Lens" (Ayako Takagi et al., SID Digest, 30.3, 2010) also describes a display device where a 2-D display and a 3-D display can be switched. The display device in "Autostereoscopic Partial 2-D/3-D Switchable Display Using Liquid-Crystal Gradient Index Lens" (Ayako Takagi et al., SID Digest, 30.3, 2010) has such a structure that only a liquid crystal lens having lens effects is provided on the display side of the display panel. Here, in the liquid crystal lens, an electrode in comb form is formed on one of the transparent substrates that are provided so as to face each other with a liquid crystal layer in between, and an electrode in plate form is formed on the other transparent substrate. In the liquid crystal lens having this structure, a first voltage is applied to the electrode in comb form, and at the same time, a second voltage is applied to the electrode in plate form so that a GRIN lens is formed having the electrode in comb form as an end portion. "Autostereoscopic Partial 2-D/3-D Switchable Display Using Liquid-Crystal Gradient Index Lens" (Ayako Takagi et al., SID Digest, 30.3, 2010) also describes a liquid crystal lens where two electrodes in comb form are formed on one transparent substrate so as to mesh with each other, and an electrode in plate form is formed on the other transparent substrate as in JP 2010-224191A.

SUMMARY OF THE INVENTION

Display devices using a liquid crystal lens have such a structure that the refractive index distribution is provided in the liquid crystal lens by controlling the alignment of liquid crystal molecules so as to have lens effects, and therefore, it is one of the important items to control the alignment of the liquid crystal molecules. As described in JP 2010-224191A, however, such a problem arises that a sufficient lens performance cannot be gained in the case where the liquid crystal layer for forming a liquid crystal lens is thin (the thickness is small).

In addition, there is a defect in the alignment of the liquid crystal molecules in the case where the liquid crystal layer is thick (the thickness is large), and therefore, in this case as well, such a problem arises that a sufficient lens performance cannot be gained. In particular, in the case where the liquid crystal lens does not have a sufficient lens performance, cross-talk occurs such that an image for the right eye is seen by the left eye of the viewer during 3-D display, and thus, such a problem arises that the display quality of the 3-D image greatly deteriorates, and a method for solving this problem has been desired.

The present invention is provided in view of these problems, and an object of the present invention is to provide a display device where it is possible to improve the display quality during 3-D display.

In order to achieve the above-described object, the display device according to the present invention is a display device for displaying an image with a two-dimensional display and a three-dimensional display being switchable, having; a first display panel for displaying an image; and a second display panel provided on the display side of the above-described first display panel in order to form a parallax by controlling the refractive index in the form of cylindrical lenses that run in a first direction and are aligned in a second direction that crosses the first direction, wherein the above-described second display panel is provided with a first substrate having a first electrode in plane form made of a transparent conductive film and a second substrate having second electrodes in linear form that run in the first direction and are aligned in the second direction, the above-described first substrate and the above-described second substrate face each other with a liquid crystal layer in between so as to provide a liquid crystal display panel, and the thickness of the above-described liquid crystal layer is equal to or smaller than such a thickness that makes the rotational angle in the direction of the deflection angle of the liquid crystal directors in a center portion of the above-described liquid crystal layer in the direction of the thickness be 90° during three-dimensional display.

According to the present invention, the display quality during 3-D display can be improved in a display device where 2-D display and 3-D display can be switched.

The other effects of the present invention will be clarified from the descriptions of the entirety of the specification.

BRIEF DESCRIPTION OF THE DRAWINGS

FIG. 9 is a table showing the existence of a defect in the alignment corresponding to the thickness of and the voltage applied to the liquid crystal layer in the second liquid crystal display panel (liquid crystal lens) according to the first embodiment of the present invention;

DESCRIPTION OF THE EMBODIMENTS

In the following, the embodiments to which the present invention is applied are described in reference to the drawings. Here, the same symbols are attached to the same components, and therefore, the same descriptions are not repeated below.

First Embodiment

Entire Structure

Figure 1:
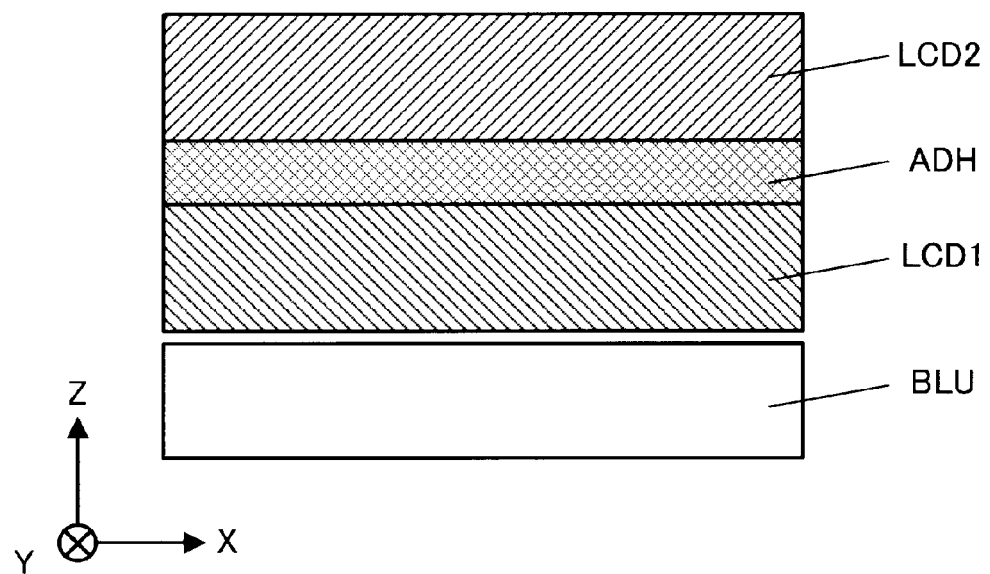
FIG. 1 is a cross-sectional diagram for illustrating the entire structure of the liquid crystal display device that is the display device according to the first embodiment of the present invention.

FIG. 1 is a cross-sectional diagram for illustrating the entire structure of the liquid crystal display device that is the display device according to the first embodiment of the present invention. In the following, the entire structure of the display device according to the first embodiment is described in reference to FIG. 1. Though a case where a non-luminous type display panel is used for the first liquid crystal display panel LCD1 for displaying an image is described below, the structure may use a self-luminous type display panel, such as an organic electroluminescence display panel (organic EL display panel), as the display panel. In addition, X, Y and Z in the diagram indicate the X axis, the Y axis and the Z axis, respectively.

The liquid crystal display device according to the first embodiment has in its structure a first liquid crystal display panel (first display panel) LCD1, which is a liquid crystal display panel for displaying an image, and a second liquid crystal display panel (liquid crystal lens panel, second display panel) LCD2 that functions as a lens (lenticular lens, cylindrical lens array) by controlling the refractive index of the light that has transmitted. In the liquid crystal display device according to the first embodiment having this structure, as shown in FIG. 1, the first liquid crystal display panel LCD1 and the second liquid crystal display panel LCD2 are layered in this order on top of a backlight unit (backlight device) DLU. That is to say, the second liquid crystal display panel LCD2 is placed on the display side (viewer side) of the first liquid crystal display panel LCD1. In order to prevent the first liquid crystal display panel LCD1 and the second liquid crystal display panel LCD2 from shifting their position, the first liquid crystal display panel LCD1 and the second liquid crystal display panel LCD2 are fixed to each other with an adhesive member ADH. Here, the adhesive member ADH is made of a resin member, such as a well-known ultraviolet curing resin (UV curing resin), and it is preferable for the member to have approximately the same refractive index as the transparent substrates for forming the first liquid crystal display panel LCD1 and the second liquid crystal display panel LCD2 (for example, a glass substrate or a resin substrate).

Meanwhile, the second liquid crystal display panel LCD2 in the first embodiment is formed of a liquid crystal display panel having homogeneous alignment where the longitudinal axes of the liquid crystal directors are aligned approximately parallel to the transparent substrates for forming the liquid crystal display panel LCD2, for example. The second liquid crystal display panel LCD2 in the first embodiment provides a two-dimensional display (2D display, plane display) where light emitted from the first liquid crystal display panel LCD1 (display image) transmits (passes) as it is in such a state that no voltage is applied to each electrode (second electrode in thin rectangular form), and a three-dimensional display (3D display, solid display) resulting from lens effects that causes a parallax for providing a parallax between the two eyes where light emitted from the first liquid crystal display panel LCD1 (display image) enters separately into the left and right eyes of the viewer when a voltage is applied. Thus, the second liquid crystal display panel LCD2 in the first embodiment is a liquid crystal display panel through which light that has entered transmits as it is in a state where no electrical field is applied to the liquid crystal, and the details thereof are described below.

In addition, the first liquid crystal display panel LCD1 may have the structure of any type of liquid crystal display panel from among a TN type liquid crystal display panel, a VA (vertical alignment) type liquid crystal display panel and an IPS (in-plane switching) type liquid crystal display panel. Here, the first liquid crystal display panel LCD1 is the same as the well-known liquid crystal display panel, and therefore, optical sheets, such as a diffusion plate, and polarizing plates are not shown, and the detailed descriptions of these are omitted.

Structure of First Liquid Crystal Display Panel

In the case where an IPS type liquid crystal display panel is used for the first liquid crystal display panel LCD1, the first liquid crystal display panel LCD1 has such a structure where a pair of transparent substrates, which are well-known, like glass substrates, are provided so as to face each other with a liquid crystal layer in between. Well-known thin film transistors and pixel electrodes are formed on one transparent substrate (first transparent substrate) of the pair, and color filters and a well-known black matrix are formed on the other transparent substrate (second transparent substrate). In the first liquid crystal display panel LCD1 having this structure, the first transparent substrate is larger than the second transparent substrate so that connection terminals for the connection to the outside are formed in a peripheral portion, for example. In addition, the first transparent substrate and the second transparent substrate are secured to each other with liquid crystal sealed in between with a well-known sealing material applied on the second transparent substrate in an annular form along the periphery. The region where pixel regions (hereinafter abbreviated as pixels) made of red (R), green (G) and blue (B) sub-pixels for a color display are formed within the region where the liquid crystal is sealed in becomes the display region. Accordingly, a region where no pixels are formed and which does not relate to displaying is not included in the display region even within a region where the liquid crystal is sealed in.

Gate lines that run in the X direction in the figure and are aligned in the Y direction as well as drain lines that run in the Y direction in the figure and are aligned in the X direction are formed on the liquid crystal side of the first transparent substrate for forming the liquid crystal display panel LCD1 in the first embodiment within the display region. Rectangular regions between drain lines and gate lines correspond to the red (R), green (G) and blue (B) color filters formed on the second transparent substrate so that pixels, each of which is made of three sub-pixels RGB are aligned in a matrix within the display region. Each of these sub-pixels is provided with: a thin film transistor that can be turned on by a scan signal from a gate line; a pixel electrode that is connected to the thin film transistor that can be turned on and the source line of this thin film transistor and to which a gradation signal (gradation voltage) from a drain line is supplied; and a common electrode to which a common signal having a potential that becomes a reference for the potential of the gradation signal is supplied. Here, in a VA type or a TN type liquid crystal display panel, common electrodes are formed on the second substrate together with the color filters.

Structure of Second Liquid Crystal Display Panel

Figure 2A:
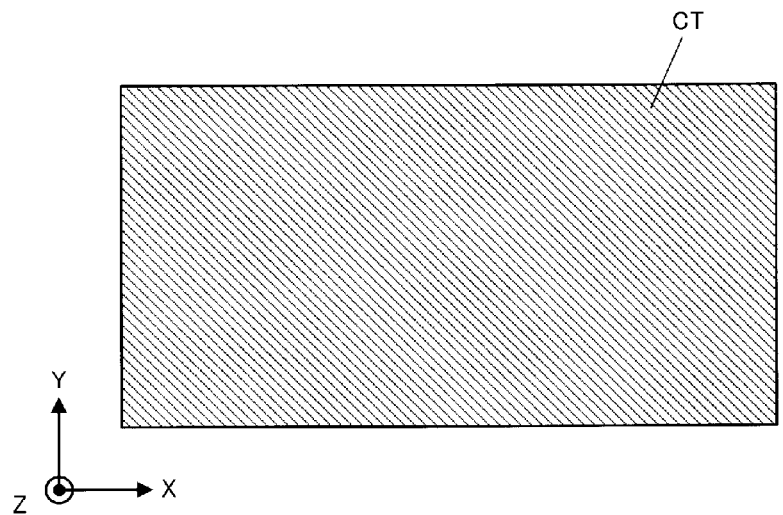
FIGS. 2A and 2B are plan diagrams for illustrating the detailed structure of the second liquid crystal display panel in the display device according to the present invention.
Figure 2B:
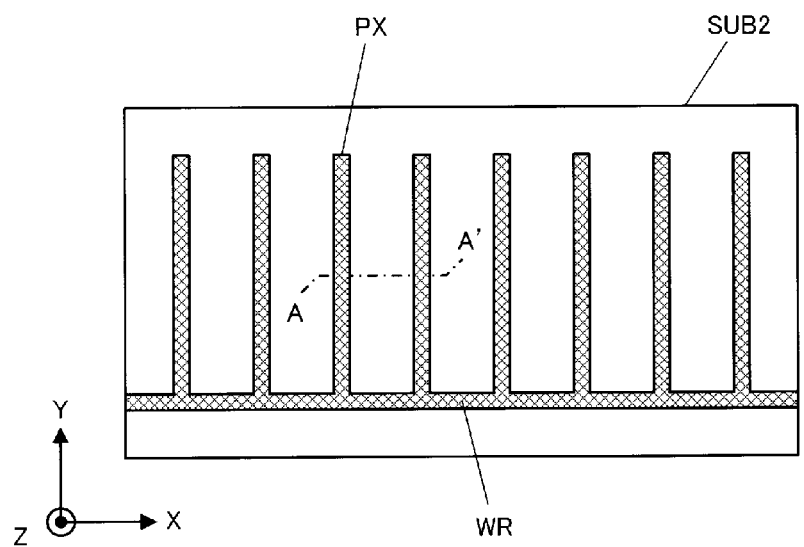
Figure 3:
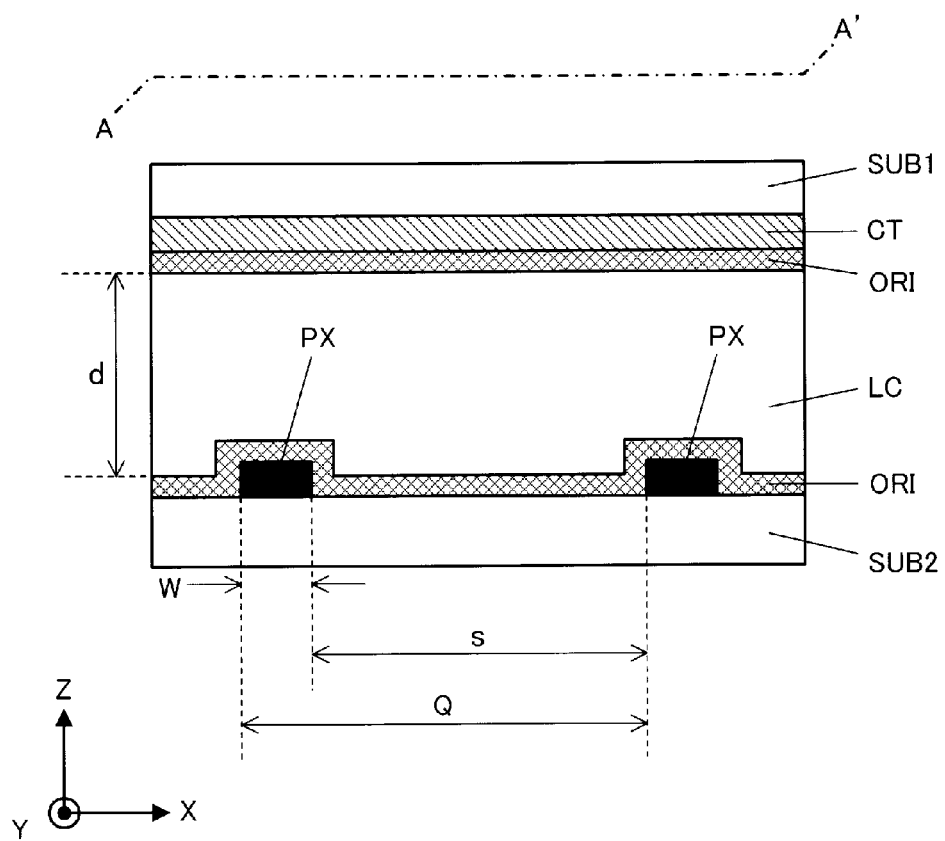
FIG. 3 is a cross-sectional diagram along line A-A' in FIG. 2B.

FIGS. 2A and 2B are plan diagrams for illustrating in detail the structure of the second liquid crystal display panel in the display device according to the present invention. FIG. 3 is a cross-sectional diagram along line A-A' in FIG. 2B. In the following, the second liquid crystal display panel in the first embodiment is described in detail in reference to FIGS. 2A to 3.

As shown in FIGS. 2A and 2B, the second liquid crystal display panel LCD2 in the first embodiment has such a structure as to be provided with a second substrate SUB2 on which second electrodes PX that are a plurality of electrodes in thin rectangular form (comb tooth form) that run in the Y direction and are aligned in the X direction and a wire portion WR for connecting the second electrodes PX at one end that runs in the X direction along one long side in the periphery of the second liquid crystal display panel LCD2 are formed. In addition, the second liquid crystal display panel LCD2 has a first substrate SUB1 that is provided so as to face the second substrate SUB2 with a liquid crystal layer in between and has a first electrode CT in plate form that is formed on the liquid crystal side of the first substrate SUB1 so as to cover at least the display region. At this time, the first electrode CT and the second electrodes PX are formed of an ITO (indium tin oxide) or ZNO (zinc oxide) based transparent conductive film, for example, while the wire portion WR is not limited to a transparent conductive film. In addition, such a structure is also possible where two wire portions WR are formed on the second substrate SUB2 along the two long sides in the periphery of the second liquid crystal display panel LCD2.

As described in detail below, this structure provides an array of cylindrical lenses in lenticular form that are refractive index distribution type (GRIN: gradient index) lenses that run in the Y direction and are aligned in the X direction in the regions between adjacent pairs of electrodes PX in thin rectangular form. Here, the region on the second liquid crystal display panel LCD2 where the array of cylindrical lenses is formed is in such a location as to correspond to the display region on the first liquid crystal display panel LCD1. As a result, in the case where the two eyes, left and right, of the viewer are aligned in the X direction, it is possible to separate light from different pixels, that is to say, images from different viewpoints to the left and right eyes of the viewer, in the liquid crystal display device in the first embodiment, and thus, three-dimensional vision is possible. Here, the form of the first electrode CT in the first embodiment is not limited to a plate form. Another example may have such a structure where electrodes in comb tooth form of which the directions in which the teeth run are orthogonal are provided on the first substrate SUB1 and the second substrate SUB2, and at the same time, other electrodes are provided so as to cover the portions on the surface of the substrate (regions) where the electrodes in comb tooth form are not formed. Though a case where the liquid crystal has a positive dielectric anisotropy is described in the present specification, it is possible to use liquid crystal having a negative dielectric anisotropy.

As shown in FIG. 3, which is a cross-section along line A-A', the above-described second liquid crystal display panel LCD2 has such a structure where a pair of transparent substrates (first substrate SUB1, second substrate SUB2) are provided so as to face each other with liquid crystal (liquid crystal layer) LC in between. On the facing side (liquid crystal side) of the second substrate SUB2 at the bottom in the figure, second electrodes PX that run in the Y direction and are aligned in the X direction are formed. In addition, an alignment film ORI made of a well-known alignment film material is formed so as to cover the second electrodes PX and the exposed surface of the second substrate SUB2 in a layer above the second electrodes PX. Meanwhile, on the facing side (liquid crystal side) of the first substrate SUB1, a first electrode CT is formed so as to cover at least the display region, and an alignment film ORI is formed so as to cover the first electrode CT on the liquid crystal side.

Detailed Description of Second Liquid Crystal Display Panel

Figure 4A:
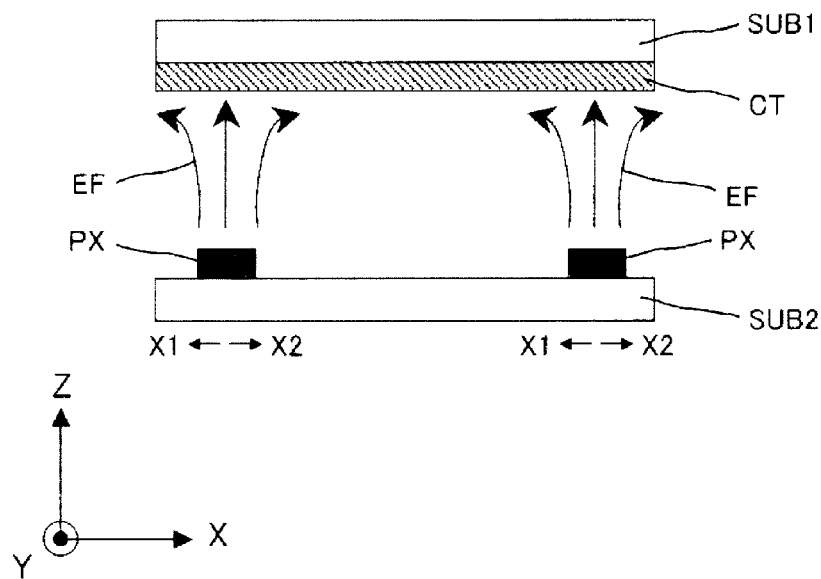
FIGS. 4A, 4B and 4C are diagrams for illustrating how the liquid crystal directors are aligned in the second liquid crystal display panel according to the first embodiment of the present invention.
Figure 4B:
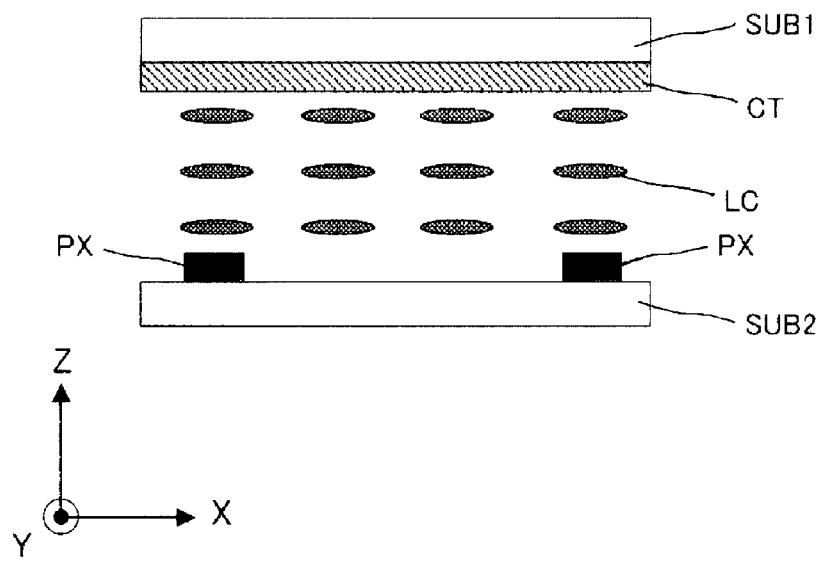
Figure 4C:
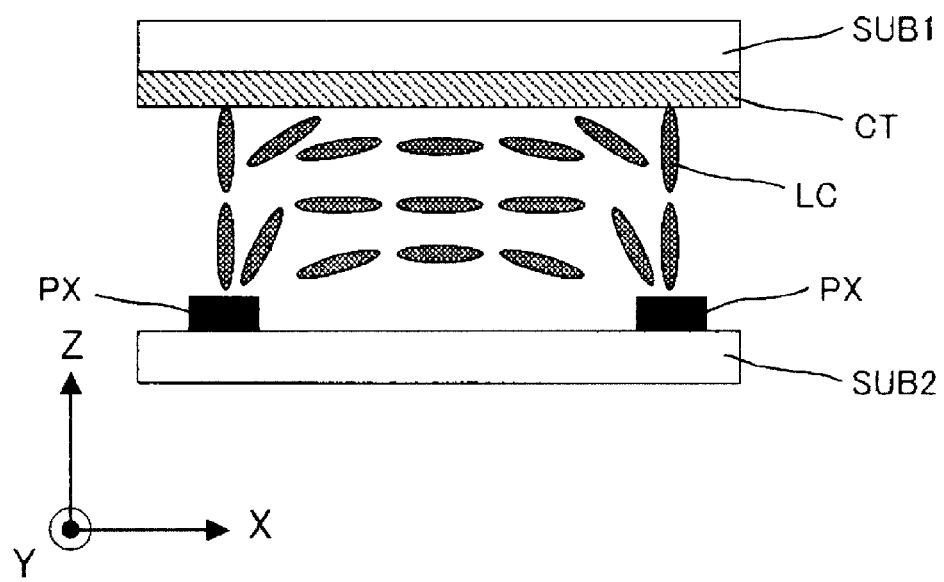
Figure 5A:
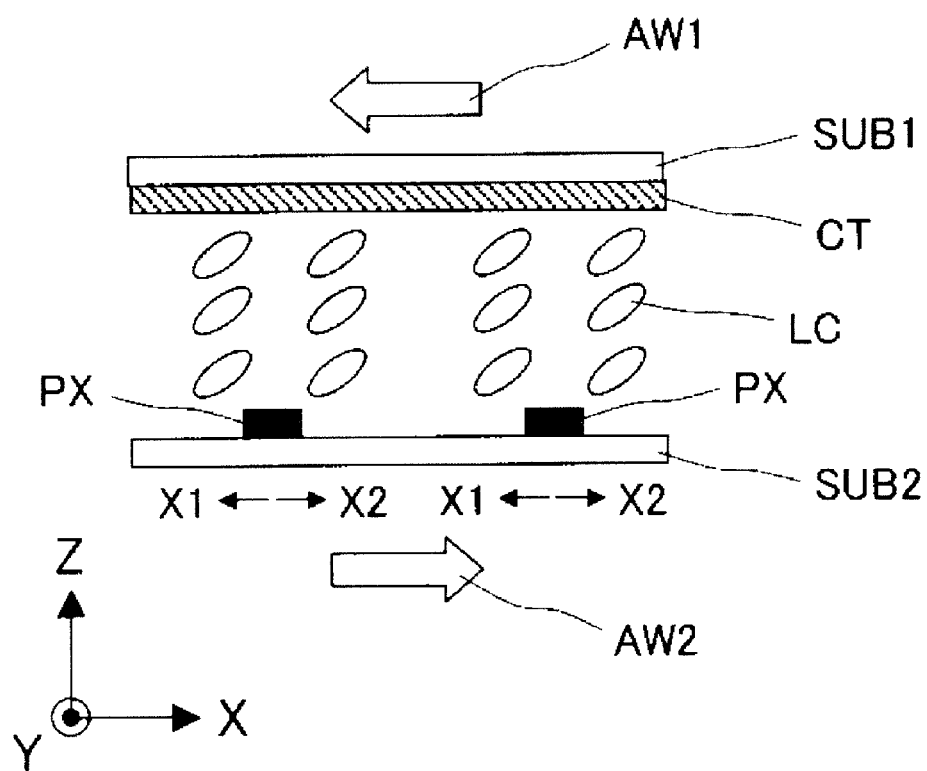
FIGS. 5A and 5B are diagrams for illustrating the direction of rubbing and the direction in which the liquid crystal directors are aligned in the case where anti-parallel rubbing is carried out on the second liquid crystal display panel according to the first embodiment of the present invention.
Figure 5B:
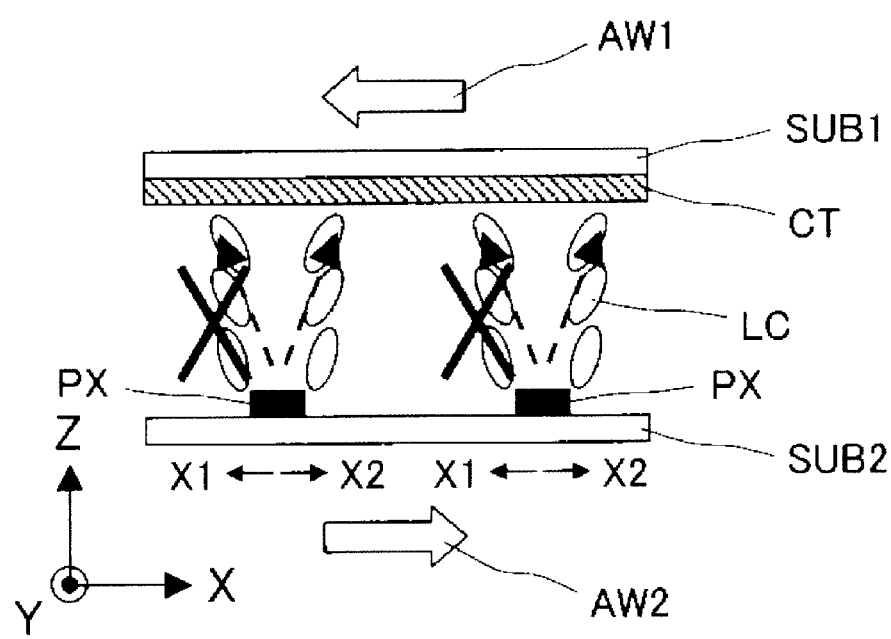
Figure 6A:
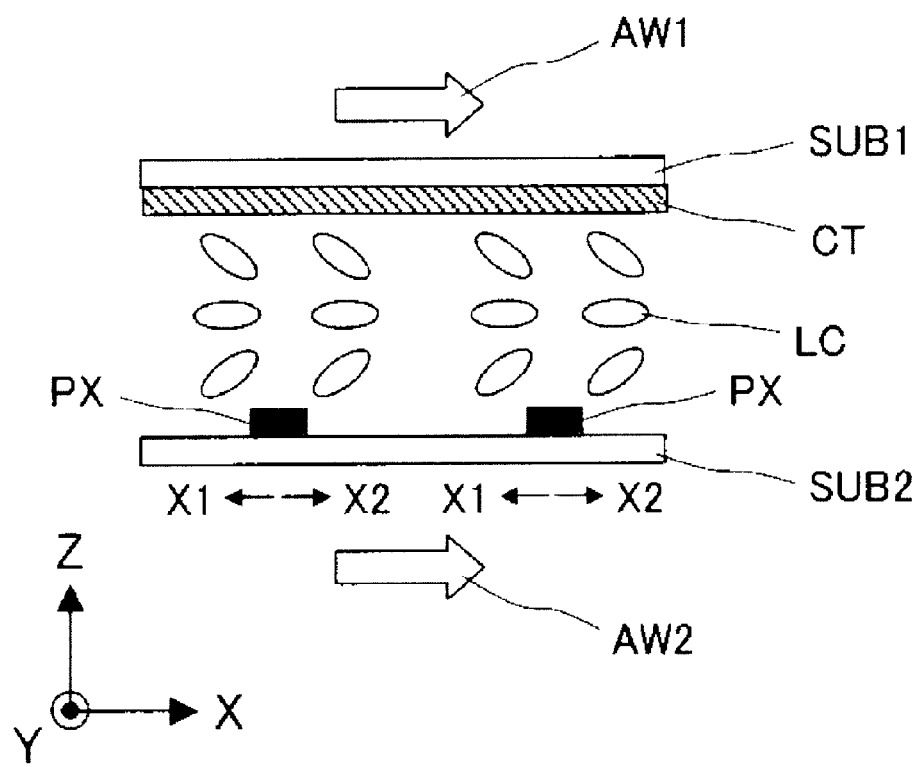
FIGS. 6A and 6B are diagrams for illustrating the direction of rubbing and the direction in which the liquid crystal directors are aligned in the case where parallel rubbing is carried out on the second liquid crystal display panel according to the first embodiment of the present invention.
Figure 6B:
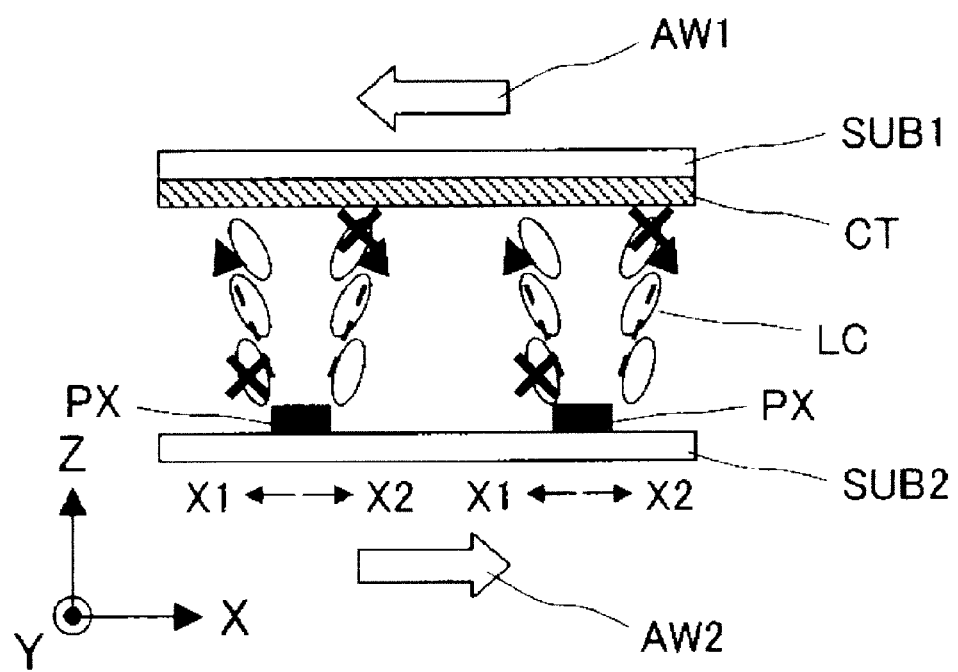

FIGS. 4A to 4C illustrate how liquid crystal directors are aligned in the second liquid crystal display panel in the first embodiment. FIGS. 5A and 5B illustrate the direction of rubbing and the direction in which liquid crystal directors are aligned in the case where anti-parallel rubbing is carried out on the second liquid crystal display panel. FIGS. 6A and 6B illustrate the direction of rubbing and the direction in which liquid crystal directors are aligned in the case where parallel rubbing is carried out on the second liquid crystal display panel. In the following, 3D display on the liquid crystal display device in the first embodiment is described in reference to FIGS. 4A to 6B. Though a case where the initial alignment of liquid crystal directors is controlled by the alignment film using a rubbing method on the second liquid crystal display panel in the first embodiment is described, the invention is not limited to this, and another alignment method, for example, optical alignment, may be used.

FIG. 4A is a diagram showing the state of an electrical field in the portion where a liquid crystal lens is formed at the time of 3D display, where different voltages are applied to the first electrode CT and the second electrodes PX. FIG. 4B is a diagram showing the state of the liquid crystal directors in the portion where a liquid crystal lens is formed at the time of 2D display, where no electrical field is applied across the first electrode CT and the second electrodes PX. FIG. 4C is a diagram showing the state of the liquid crystal directors in the portion where a liquid crystal lens is formed at the time of 3D display, where an electrical field is applied across the first electrode CT and the second electrodes PX. FIGS. 5A and 6A show the state of the liquid crystal directors in the case where no electrical field is applied across the first electrode CT and the second electrodes PX, that is to say, in the state of initial alignment. FIGS. 5B and 6B show the state of the liquid crystal directors in the case where an electrical field is applied across the first electrode CT and the second electrodes PX. In FIGS. 4A to 6B, alignment films ORI provided on the first substrate SUB1 and the second substrate SUB2 on the liquid crystal side are not shown.

As shown in FIG. 4A, second electrodes PX made of a transparent conductive material are formed on the facing side of the second substrate SUB2 that is provided so as to face the first substrate SUB1 that is provided on the viewer side of the second liquid crystal display panel LCD2, and a first electrode CT in plate form made of a transparent conductive material is formed on the facing side of the first substrate SUB1 that is provided so as to face the second substrate SUB2 with a liquid crystal layer LC in between. In the case where a 2D display is provided on the liquid crystal display device using the second liquid crystal display panel LCD3 having the above-described structure, an image corresponding to the 2D display, that is to say, the same image as on a conventional 2D display, is displayed on the first liquid crystal display panel LCD1. At this time, the same voltage is applied to the first electrode CT and the second electrodes PX on the second liquid crystal display panel LCD2 that is provided on the viewer side of the first liquid crystal display panel LCD1 so that no electrical field is generated between the first electrode CT and the second electrodes PX in the structure. As a result, as shown in FIG. 4B, the liquid crystal directors LC stay in the state of initial alignment so that the light for display from all the pixels in the first liquid crystal display panel LCD1 reaches the left and right eyes of the viewer, and thus, a 2D display image is seen.

Meanwhile, in the case of a 3D display, as shown in FIG. 4A, cylindrical lenses in lenticular form, which are refractive index distribution type lenses running in the Y direction and aligned in the X direction, are formed between each pair of second electrodes PX that are adjacent to each other in the structure when lines of electric force EF are generated between the first electrode CT and the second electrodes PX as indicated by the arrows. That is to say, as shown in FIG. 4C, the lines of electric force EF generated between the first electrode CT and the second electrodes PX control the direction in which the liquid crystal directors are aligned so that the refractive index of the liquid crystal is changed between the two adjacent second electrodes PX, and thus, a refractive index distribution type lens (cylindrical lens) is formed.

The present inventor examined a defect in the alignment that is caused in the cases where the directions of rubbing on the alignment films ORI formed on the first substrate SUB1 and the second substrate SUB2, respectively, are parallel to each other (same direction) and anti-parallel to each other (opposite directions).

As shown in FIGS. 5A and 5B, a case of so-called anti-parallel rubbing where the direction of rubbing on the alignment film ORI, not shown, formed on the first substrate SUB1 (indicated by the white arrow AW1 in FIGS. 5A and 5B) and the direction of rubbing on the alignment film ORI, not shown, formed on the second substrate SUB2 (indicated by the white arrow AW2 in FIGS. 5A and 5B) are anti-parallel to each other is described below. As shown in FIG. 5A, liquid crystal directors LC located in the vicinity of the first substrate SUB1 are aligned in such a direction that the long axes of these are directed in the direction indicated by the white arrow AW1 in the initial state, that is to say, in the case where no electrical field is applied across the first electrode CT and the second electrodes PX (no lines of electric force EF are generated). At this time, the liquid crystal directors LC are in such a state that the X1 side in the direction of the longitudinal axes rises from the surface of the first substrate SUB1 by a pre-tilt angle in the direction of the rubbing. Likewise, the liquid crystal directors LC located in the vicinity of the second substrate SUB2 are aligned so that the direction of the longitudinal axes of them is directed in the direction as indicated by the white arrow AW2. Accordingly, the liquid crystal directors LC in the vicinity of the second substrate SUB2 are in such a state that the X2 side in the direction of the longitudinal axes of them rises from the surface of the second substrate SUB2 by a pre-tilt angle.

In the case where an electrical field is applied (lines of electric force EF are generated) in the direction from the first electrode CT to the second electrodes PX, as shown in FIG. 5B, liquid crystal directors LC are aligned so that the direction of the longitudinal axes of these are directed along the lines of electric force EF, as shown in FIG. 4A. Here, as indicated by the dotted arrows in FIG. 5B, lines of electric force EF are generated in the directions diagonal to the Z direction, which is the direction of the thickness of the liquid crystal layer in the vicinity of the regions where the first electrode CT and the second electrodes PX are located so as to overlap with the liquid crystal layer LC in between. As a result, the longitudinal axes of the liquid crystal directors are aligned diagonally along the lines of electric force EF.

Here, the lines of electric force EF indicated by the dotted arrows in FIG. 5B are inclined towards X2 relative to the Z direction in the vicinity of the regions on the X2 side of the second electrodes PX. As a result, the direction of the longitudinal axes of the liquid crystal directors LC in the regions in the vicinity of the second electrodes PX on the X2 side is the same as the direction of rubbing on the alignment film ORI, and thus, no defects in the alignment are caused.

Meanwhile, the lines of electric force EF indicated by the dotted arrows in FIG. 5B are inclined towards X1 relative to the Z direction in the vicinity of the regions of the second electrodes PX on the X1 side. As a result, the direction of the longitudinal axes of the liquid crystal directors LC in the regions of the second electrodes PX on the X1 side is opposite to the direction of rubbing on the alignment film ORI, and thus, some defects in the alignment are caused. That is to say, the liquid crystal directors LC on the X1 side of the second electrodes PX must rotate counterclockwise in the XZ plane in FIG. 5A so as to be aligned along the lines of electric force EF, for example. However, they rotate clockwise so as to be aligned along the lines of electric force EF, and therefore, some defects in the alignment are caused. In particular, as shown in FIG. 5B, they are directed opposite to the direction of rubbing indicated by the arrow AW1 in the vicinity of the first substrate SUB1. Accordingly, they are directed opposite to the direction of rubbing indicated by the arrow AW2 in the vicinity of the second substrate SUB2 as well, and therefore, some defects in the alignment are caused in wide (large) regions ranging from the first substrate SUB1 to the second substrate SUB2 in the Z direction, which is the direction of the thickness of the liquid crystal layer as indicated by X in the figure. Furthermore, in the case where defects in the liquid crystal are caused in a wide range, the defects in the alignment may affect the adjacent regions so as to cause the defects in the alignment to grow, and thus, there is a concern that the region of the defects in the alignment may expand further.

Next, a case of so-called parallel rubbing where the direction of rubbing on the alignment film ORI on the first substrate SUB1 (indicated by the white arrows AW1 in FIGS. 6A and 6B) and the direction of rubbing on the alignment film ORI on the second substrate SUB2 (indicated by the white arrows AW2 in FIGS. 6A and 6B) are parallel (the same direction), as shown in FIGS. 6A and 6B, is described.

As shown in FIG. 6A, in the initial state, the liquid crystal directors LC located in the vicinity of the first substrate SUB1 and the second substrate SUB2 are aligned so that the direction of the longitudinal axes of these is directed in the direction indicated by the white arrows AW1 and AW2. Here, the liquid crystal directors LC are in such a state that the X2 side in the direction of the longitudinal axes in the direction of rubbing rises from the surfaces of the substrates (surfaces of the first substrate SUB1 and the second substrate SUB2) by a pre-tilt angle. That is to say, the liquid crystal directors LC in proximity to the first substrate SUB1 are in such a state that the X2 side in the direction of alignment indicated by the arrow AW1 in the figure rises, and the liquid crystal directors LC in proximity to the second substrate SUB2 are in such a state that the X2 side in the direction of alignment indicated by the arrow AW2 in the figure rises.

In the case where an electrical field is applied (lines of electric force EF are generated) in the direction from the first electrode CT to the second electrodes PX, the liquid crystal directors LC are aligned so that the direction of the longitudinal axes of these is along the lines of electric force EF, as shown in FIG. 4A, and thus, the alignment becomes that shown in FIG. 6B. At this time, some defects in the alignment are caused to the liquid crystal directors LC in the regions close to the first substrate SUB1 in the regions on the X2 side in the figure in the vicinity of the regions where the first electrode CT and the second electrodes PX are located so as to overlap with the liquid crystal layer LC in between. In addition, some defects in alignment are caused to the liquid crystal directors LC in the regions close to the second substrate SUB2 in the regions on the X1 side in the figure. These regions where defects in alignment are caused are indicated by X in the figure. The regions where defects in the alignment are caused are separated to the X1 side and the X2 side by the regions in proximity to the first substrate SUB1 and the second substrate SUB2, and therefore, the regions where defects in the alignment are caused are kept small. That is to say, defects in the alignment are caused only in the vicinity of the first substrate SUB1 or the second substrate SUB2 and in the vicinity of the regions where the first electrode CT and the second electrodes PX are located so as to overlap with the liquid crystal layer LC in between, and therefore, the effects of these defects in the alignment on the adjacent regions can be suppressed.

Accordingly, parallel rubbing is more appropriate than anti-parallel rubbing in order to make the regions where defects in the alignment are caused smaller. Therefore, parallel rubbing is preferable in the second liquid crystal display panel in the first embodiment, and furthermore, spray alignment, where the initial alignment of the liquid crystal directors LC is almost parallel to the direction of the plane of the substrate at a predetermined pre-tilt angle, is preferable. Here, it is preferable for the angle $\theta$ to be in a range that meets $0<\theta\leq 10°$ when $\theta$ is the angle formed between the direction of rubbing on the alignment films ORI formed on the first substrate SUB1 and the second substrate SUB2, respectively, and the direction in which the second electrodes PX run. That is to say, it is preferable for the direction of rubbing on the alignment films ORI formed on the first substrate SUB1 and the second substrate SUB2, respectively, and the direction in which the second electrodes PX run to be approximately parallel to each other.

Figure 7:
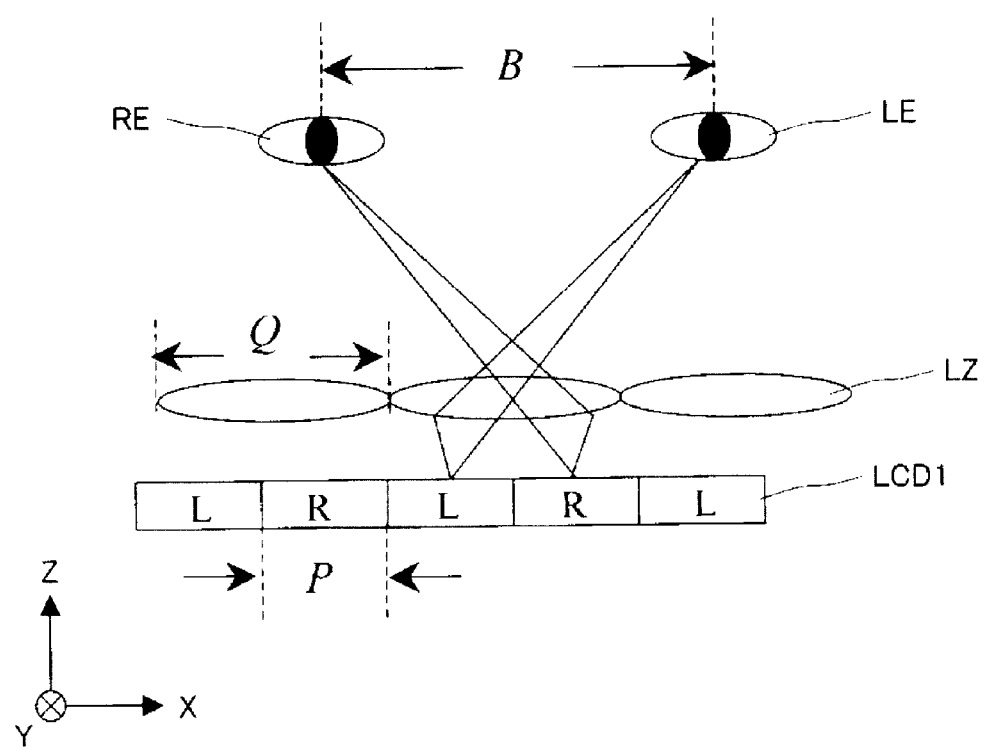
FIG. 7 is a diagram for illustrating the relationship between the viewer and the first liquid crystal display panel during 3-D display using a liquid crystal lens.
Figure 8:
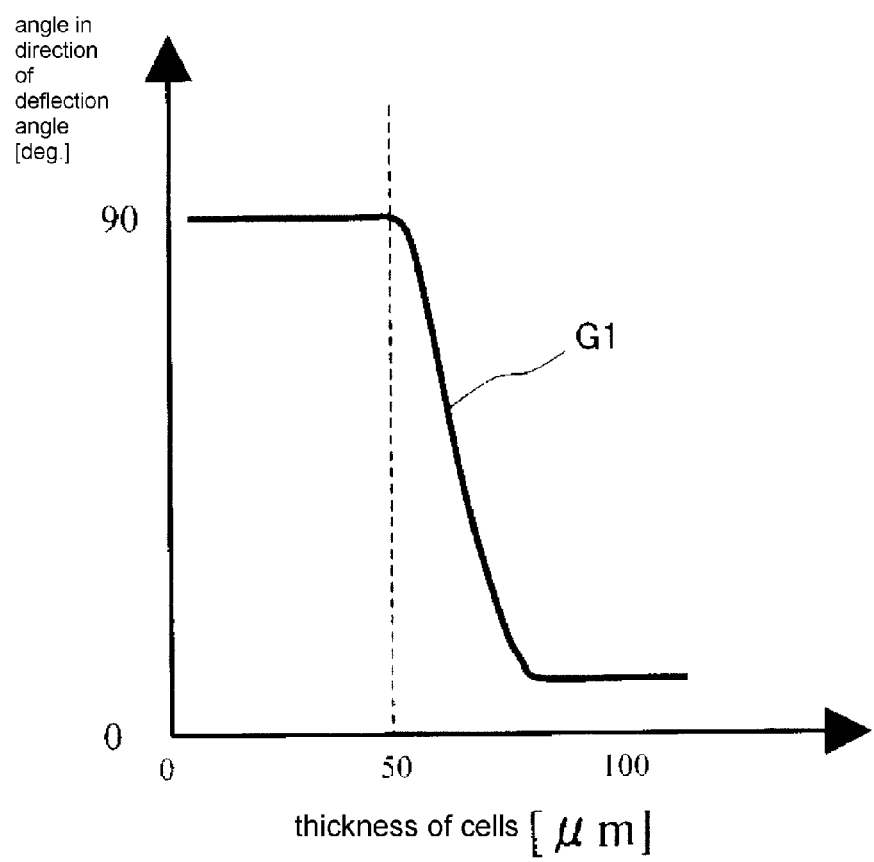
FIG. 8 is a graph showing the measured values of the thickness of the liquid crystal layer in the second liquid crystal display panel (liquid crystal lens) according to the first embodiment of the present invention and the alignment angle of the liquid crystal directors in a region above the second electrode.

FIG. 7 is a diagram for illustrating the relationship between the viewer at the time of 3D display using liquid crystal lenses, the first liquid crystal display panel and the liquid crystal lenses. FIG. 8 is a graph showing the measured value of the alignment angle of the liquid crystal directors in the regions above the second electrodes relative to the thickness of the liquid crystal layer in the second liquid crystal display panel (liquid crystal lenses) in the first embodiment. FIG. 9 is a table showing the existence of defects in the alignment corresponding to the thickness of the liquid crystal layer in and the voltage applied to the second liquid crystal display panel (liquid crystal lenses) in the first embodiment. In the following, the second liquid crystal display panel in the first embodiment is described in detail in reference to FIGS. 7 to 9. Here, FIG. 8 shows the measured value in the case where a voltage that can generate a sufficient electrical field between the first electrode CT and the second electrodes PX, that is to say, a voltage that is sufficiently higher than the threshold voltage for moving the liquid crystal, is applied to the respective electrodes. In addition, FIG. 8 shows the average alignment angle in the case where measurement is typically carried out in the regions above the second electrodes PX, which are regions where defects are easily caused to the liquid crystal (the regions where defects are caused to the liquid crystal as shown in FIGS. 6A and 6B), and in particular shows the alignment angle in the center portion of the liquid crystal layer in the direction of the thickness. Furthermore, defects may be caused to the liquid crystal in the regions other than the regions above the second electrodes PX as well.

As shown in FIG. 7, the display device in the first embodiment makes 3D display possible for the naked eye by providing parallax to the two eyes of the viewer. Accordingly, as shown in FIG. 7, the intervals between the second electrodes PX are such that the image for the right eye R displayed on the first liquid crystal display panel LCD1 enters into the right eye RE of the viewer and the image for the left eye L enters into the left eye LE. At this time, the intervals between the second electrodes PX change depending on the location of the viewpoint of the viewer, and therefore, the distance B between the left and right eyes, the pitch P of the pixels in the first liquid crystal display panel LCD1, and the pitch Q of the liquid crystal lenses LZ formed in the second liquid crystal display panel LCD2 form the relationship shown in the following formula (1).

(Formula 1)

$$Q=2P/(1+P/B) \quad (1)$$

Accordingly, the first liquid crystal display panel LCD1 and the second liquid crystal display panel LCD2 that form the liquid crystal display device according to the first embodiment have such a structure that the pitch P of the pixels and the pitch Q of the lenses satisfy the formula (1) corresponding to the preset viewpoint. Here, the liquid crystal display device according to the first embodiment is not limited to the one having two viewpoints and can be applied to a multiple viewpoints system that has two or more viewpoints.

As is clear from FIG. 8 showing the measured value in the relationship between the thickness of the liquid crystal layer and the alignment angle of the liquid crystal directors in the regions above the second electrodes (angle in the direction of the deflection angle, which is the angle of rotation that rises from the surface of the substrate) in the case where the distance B between the left and right eyes of the viewer is 65 mm, the birefringent index Δn, which is the value of the physical properties of the liquid crystal, is 0.2, the dielectric anisotropy ΔE is 7.3, the size of the display device according to the first embodiment, that is to say, the size of the display region, is 3.2 inches, the number of pixels is 480×854, the pitch P of the pixels is 79.5 μm, the pitch Q of the lenses is 158.8058 . . . μm, and the width W of the second electrodes is 10 μm, the alignment angle of the liquid crystal directors LC can be made to be 90° when the thickness of the liquid crystal layer is in a range of approximately 50 μm or less. That is to say, defects in the alignment of the liquid crystal directors LC can be prevented from being caused when the second liquid crystal display panel LCD2 is formed so that the thickness of the liquid crystal layer is 50 μm or less.

Furthermore, as is clear from the relationship between the applied voltage and the thickness of the liquid crystal layer in FIG. 9, no defects in the alignment are caused irrelevant of the thickness of the liquid crystal layer in the case where the voltage applied across the first electrode CT and the second electrodes PX is 0 V, that is to say, at the time of 2D display. Meanwhile, no defects are caused to the liquid crystal when the thickness of the liquid crystal layer is 50 μm or less, while some defects are caused to the liquid crystal when the thickness of the liquid crystal layer is greater than 50 μm in the case where the voltage applied across the first electrode CT and the second electrodes PX is 6 V, that is to say, at the time of 3D display. In addition, no defects are caused to the liquid crystal when the thickness of the liquid crystal layer is 50 μm or less, while some defects are caused to the liquid crystal when the thickness of the liquid crystal layer is greater than 50 μm in the case where the applied voltage is 10 V. Accordingly, the second liquid crystal display panel LCD2 according to the first embodiment is formed so that the thickness of the liquid crystal layer is 50 μm or less. When the second liquid crystal display panel LCD2 is driven so that the voltage applied across the first electrode CT and the second electrodes PX is 6 V or higher, it is possible to greatly reduce the defects in the alignment caused in the lens regions. As a result, cross talk caused by the defects in the alignment can be greatly reduced at the time of 3D display, and therefore, it is possible to greatly increase the quality of the display of 3D images.

As described above, the alignment films are formed on the first substrate SUB1 and the second substrate SUB2 using parallel rubbing in the same direction in the second liquid crystal display panel LCD2 for forming the display device according to the first embodiment. Furthermore, the second liquid crystal display panel LCD2 is formed so that the distance between the first substrate SUB1 and the second substrate SUB2, that is to say, the thickness of the liquid crystal layer sealed between the first substrate SUB1 and the second substrate SUB2, is 50 μm or less. As a result, it is possible to greatly reduce the defects in the alignment in the portions where the first electrode CT and the second electrodes PX overlap as well as in their vicinity even in the case where the driving voltage at the time of 3D display is 6 V, and thus, in particular, the display quality at the time of 3D display can be greatly improved. It is also possible to reduce the driving voltage for 3D display by optimizing the thickness of the liquid crystal layer, and thus, special effects can be gained such that the power consumption for 3D display can be reduced.

Second Embodiment

Figure 10:
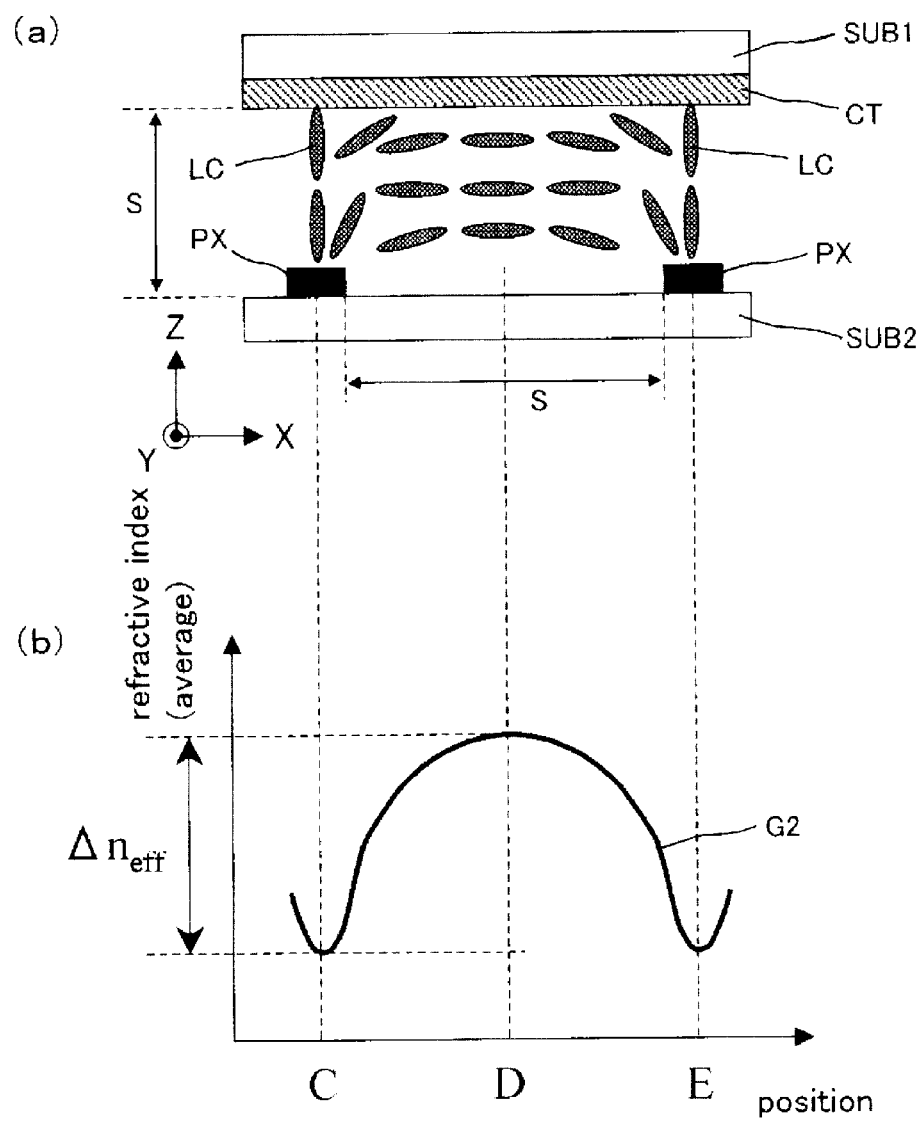
FIG. 10 is a schematic diagram for illustrating the structure of the second liquid crystal display panel in the display device according to the second embodiment of the present invention.

FIG. 10 is a schematic diagram for illustrating the structure of the second liquid crystal display panel in the display device according to the second embodiment of the present invention. In particular, the portion (a) in FIG. 10 is a diagram showing how the liquid crystal directors are aligned at the time of 3D display, and the portion (b) in FIG. 10 is a graph showing the distribution of the average refractive index in the direction of the thickness (Z direction) relative to the location in the X direction in the second liquid crystal display panel LCD2 in the portion (a) in FIG. 10. The liquid crystal display device according to the second embodiment provides a second liquid crystal display panel LCD2 where the pitch of the lenses at the time of 3D display, that is to say, the pitch of the second electrodes PX aligned in the X direction, is optimized. Here, the second liquid crystal display panel LCD2 shown in the portion (a) in FIG. 10 is formed so that the thickness of the liquid crystal layer is 50 μm, and the basic structure of the first electrode CT and the second electrodes PX is the same as in the liquid crystal display panel LCD2 in the first embodiment. In addition, the average refractive index in the portion (b) in FIG. 10 is the average refractive index in the case where the driving voltage of 6 V is applied across the first electrode CT and the second electrodes PX.

As described above, the alignment of the liquid crystal directors LC at the time of 3D display is directed along the lines of electric force EF, as shown in FIG. 4A. Accordingly, as shown in the portion (a) in FIG. 10, the director, which is the direction of the longitudinal axes of the liquid crystal directors LC, is the direction that is orthogonal to the direction of the plane on the first and second substrates SUB1 and SUB2, that is to say, the Z direction in the regions where the first electrode CT and the second electrodes PX overlap with the liquid crystal layer LC in between. In contrast, the lines of electric force EF become more parallel to the surfaces of the substrates of the second liquid crystal display panel LCD2 as the location is further away from these overlapping regions, and the direction of the longitudinal axes of the liquid crystal directors LC also becomes more parallel to the surfaces of the substrates of the second liquid crystal display panel LCD2. At this time, the refractive index of the transmitted light changes in response to the refractive index ne of the liquid crystal directors LC in the direction of the longitudinal axes, that is to say, in the direction of alignment, and the refractive index no of the liquid crystal directors LC in the direction perpendicular to the direction of the longitudinal axes. Therefore, the average refractive index is minimum in the portions above the second electrodes PX, that is to say, in the portions where the first electrode CT and the second electrodes PX overlap with the liquid crystal layer LC in between, and is maximum in the center portion between two second electrodes PX. As a result, as shown in the curve G2 in the portion (b) in FIG. 10, the distribution of the refractive index is formed in lens form in the X direction between the points C and E at the time of 3D display when the center points in the X direction of the regions where the first electrode CT and the second electrodes PX overlap with the liquid crystal layer LC in between are points C and E, respectively, and the center point between a pair of adjacent second electrodes PX is point D. That is to say, refractive index distribution type lenses (cylindrical lenses) aligned in the X direction are formed in the second liquid crystal display panel LCD2.

In the second liquid crystal display panel LCD2 having this structure, the degree of the concentration of light increases at a focal distance of the lenses when the distribution of the refractive index is a quadratic curve. Accordingly, it is preferable for the curve G2 in the portion (b) in FIG. 10 to form a quadratic curve between C and D as well as between D and E.

Accordingly, the distribution of the refractive index in the direction in which the second electrodes PX are aligned in the second liquid crystal display panel LCD2 is examined below. As shown in the portion (b) in FIG. 10, the difference between the minimum value and the maximum value of the average refractive index is defined as $\Delta n_{eff}$. The focal distance F of the lenses when the distribution of the refractive index of the liquid crystal lenses forms a quadratic curve, that is to say, the curve G2 forms a quadratic curve, can be found by the following formula (2).

(Formula 2)

$$F = n \times Q^2 / (8 \times \Delta n_{eff} \times d) \quad (2)$$

Here, n is the refractive index of the second liquid crystal display panel LCD2, which is the substrate of the liquid crystal lenses, and d is the thickness of the liquid crystal layer of the liquid crystal lenses.

In this case, it is desirable for the focal distance F to be the distance between the liquid crystal lenses and the display pixels, and therefore, it is advantageous for $\Delta n_{eff}$ to be large in order for the thickness d of the liquid crystal layer to be thin, that is to say, the greater $\Delta n_{eff}$ is, the smaller the thickness of the second liquid crystal display panel LCD2 for forming the liquid crystal lenses is.

Figure 11:
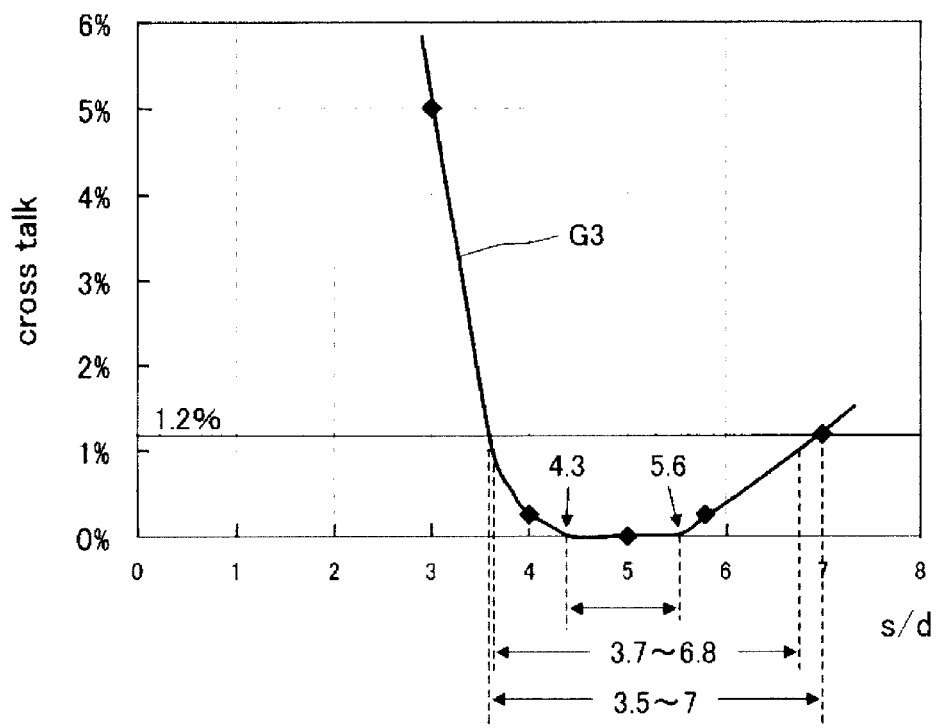
FIG. 11 is a graph showing the ratio at which cross talk occurs relative to the value (s/d) gained by standardizing the distance s between the electrode on the second liquid crystal display panel with the thickness d of the liquid crystal layer according to the second embodiment of the present invention.

FIG. 11 is a graph showing the ratio at which cross talk is generated relative to the value (s/d) gained by standardizing the distance s between the electrodes in the second liquid crystal display panel in the second embodiment with the thickness d of the liquid crystal layer. In the following, the distance s between electrodes and the thickness d of the liquid crystal layer are described in reference to FIG. 11. Here, the cross talk in FIG. 11 is calculated using a beam-tracking simulator (ASAP made by BRO Company) from the results gained through calculation of the alignment of liquid crystal using a simulator (LCD-Master made by Shintech Corporation). In addition, the beam-tracking simulator used the average value of the refractive index in the direction of the thickness (Z direction) from the alignment of the liquid crystal.

As is clear from the curve G3 in FIG. 11, the ratio at which cross talk occurs changes greatly in response to the standardized value (s/d) when the distance between the end portion of a second electrode PX and the end portion of an adjacent second electrode PX is the distance s between electrodes and the thickness of the liquid crystal layer in the second liquid crystal display panel LCD2 is d. That is to say, the ratio at which cross talk occurs is 0%, which makes very good 3D display possible in the case where the standardized value (s/d) is in a range that satisfies 4.5<s/d<5.5.

Meanwhile, the quality of 3D display is not substantially lowered even in the case where the ratio at which cross talk occurs is approximately 1.2%, and in particular, it is known that the occurrence of cross talk itself is very difficult to perceive by the naked eye in the case where the ratio at which cross talk occurs is approximately 1.0%. Accordingly, the distance s between electrodes, which is the distance between the end portion of a second electrode PX and the end portion of an adjacent second electrode PX, and the thickness d of the liquid crystal layer in the second liquid crystal display panel LCD2 can be adjusted to a range that satisfies 3.5<s/d<7 so that the ratio at which cross talk occurs is 1.2% or less, and thus, a display device of which the quality of 3D display is improved can be provided. At this time, it is desirable for s/d to satisfy 3.7<s/d<6.8 so that the cross talk is 1% or less, which can further improve the display quality because cross talk of 1% or less is difficult to perceive by the naked eye. It is more desirable for s/d to be in a range that satisfies 4.3<s/d<5.6, which makes the ratio at which cross talk occurs be approximately 0%.

Figure 12:
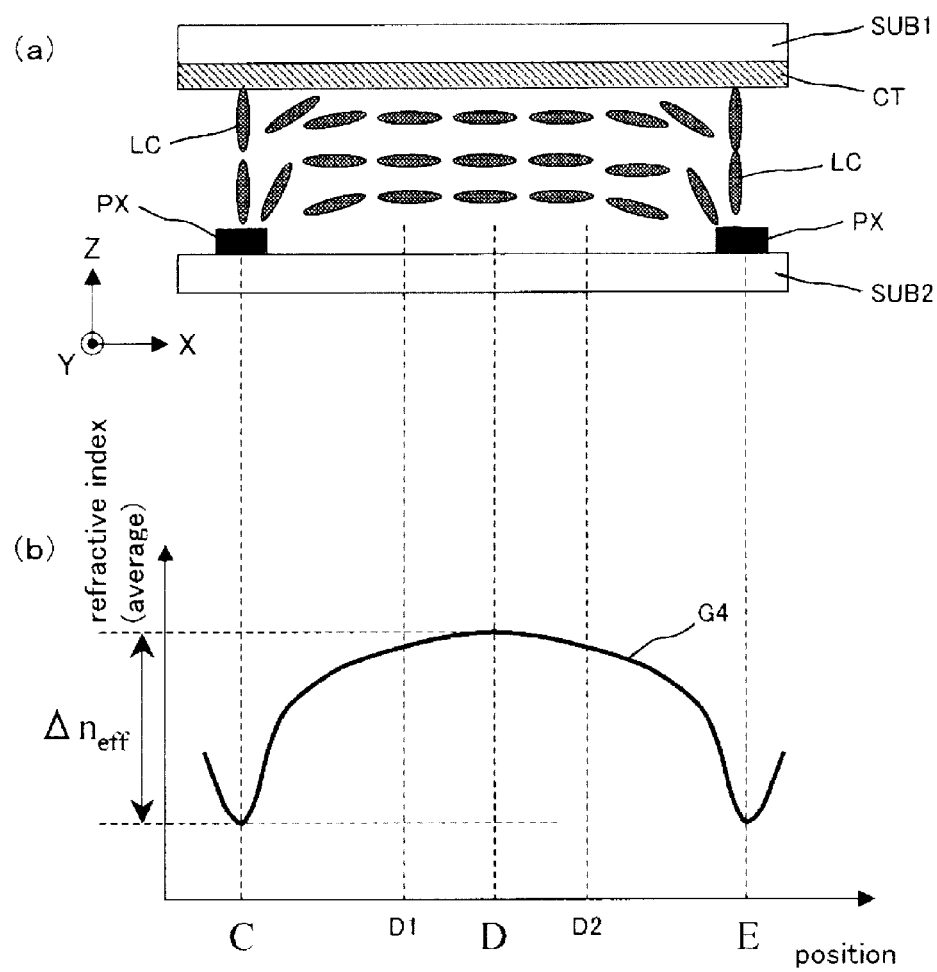
FIG. 12 is a diagram for illustrating a case where the distance between electrodes is large in the second liquid crystal display panel according to the second embodiment of the present invention.
Figure 13:
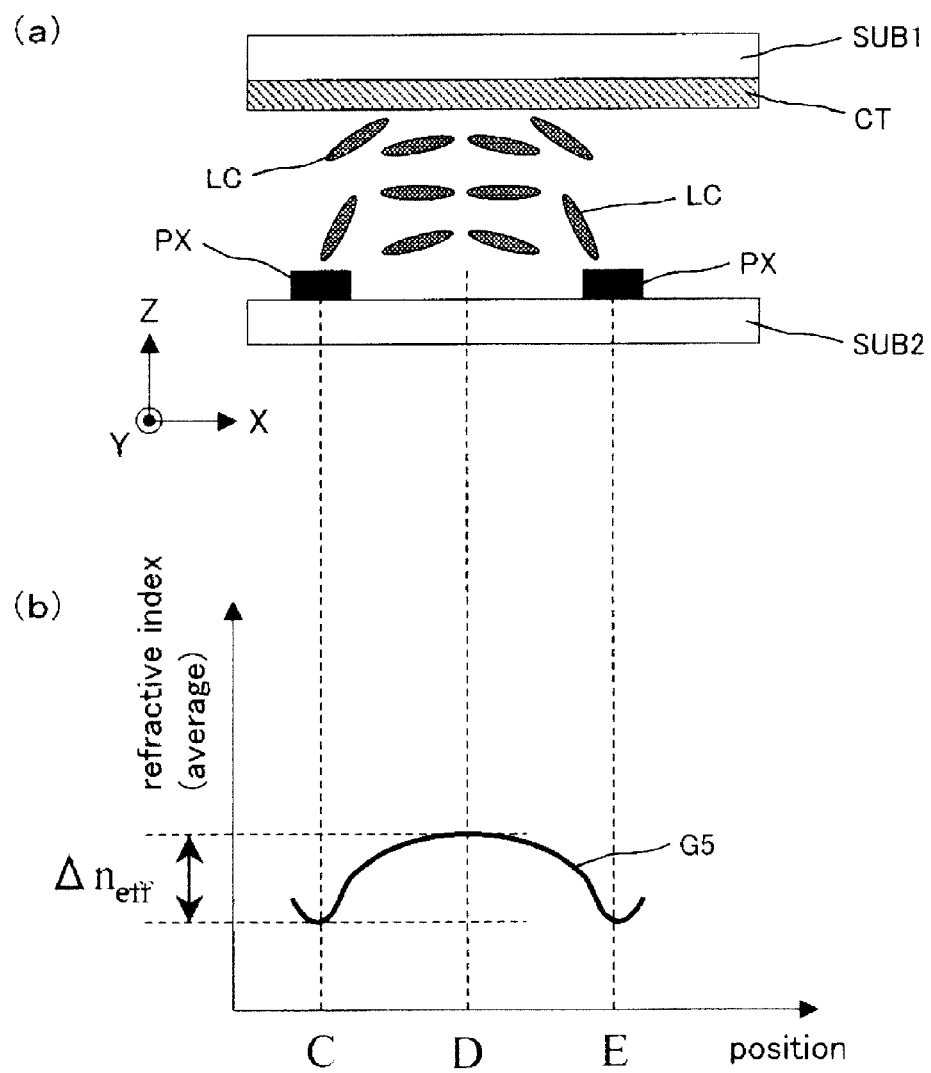
FIG. 13 is a diagram for illustrating a case where the distance between electrodes is small in the second liquid crystal display panel according to the second embodiment of the present invention.

FIG. 12 is a diagram for illustrating a case where the distance between electrodes is large in the second liquid crystal display panel in the second embodiment. FIG. 13 is a diagram for illustrating a case where the distance between electrodes is small in the second liquid crystal display panel in the second embodiment. In the following, liquid crystal lenses in cases where the standardized value (s/d) is greater than the upper limit and smaller than the lower limit of the above-described range are described. Here, the portion (a) in FIG. 12 is a diagram showing how the liquid crystal directors are aligned at the time of 3D display in the case where the standardized value (s/d) in the second liquid crystal display panel LCD2 is 7, and the portion (b) in FIG. 12 is a graph showing the distribution of the average refractive index in the direction of the thickness (Z direction) relative to the position in the X direction at that time. In addition, the portion (a) in FIG. 13 is a diagram showing how the liquid crystal directors are aligned at the time of 3D display in the case where the standardized value (s/d) in the second liquid crystal display panel LCD2 is 4, and the portion (b) in FIG. 13 is a graph showing the distribution of the average refractive index in the direction of the thickness (Z direction) relative to the position in the X direction at that time. Furthermore, the second liquid crystal display panel LCD2 shown in the portion (a) in FIG. 12 and in the portion (a) in FIG. 13 has the same structure, including the thickness d of the liquid crystal layer, as that of the second liquid crystal display panel LCD2 in the second embodiment, except that the distance s between the second electrodes PX is different.

As shown in FIG. 12, a sufficient electrical field is applied to the liquid crystal directors LC close to the second electrodes PX as in the second liquid crystal display panel LCD2 in the second embodiment shown in FIG. 10 in the case where the standardized value (s/d) is 7, that is to say, the distance s between the second electrodes PX is large relative to the thickness d of the liquid crystal layer. That is to say, as shown in the portion (b) in FIG. 12, the distribution of the refractive index between C and D1 as well as between D2 and E, which is in the vicinity of the points C and E, form a quadratic curve. In contrast, the electrical field applied to the liquid crystal directors LC becomes smaller as the distance from the second electrodes PX increases, and therefore, as shown in the portion (a) in FIG. 12, a sufficient electrical field is not applied to the liquid crystal directors LC in the vicinity of point D, which is between two second electrodes PX. That is to say, as shown in the portion (b) in FIG. 12, the distribution of the refractive index between D1 and D2, which is in the vicinity of point D, does not form a quadratic curve. As a result, the focal points are different in the vicinity of the second electrodes PX and in the vicinity of the center point between second electrodes PX in the liquid crystal lenses formed in the second liquid crystal display panel LCD2 in FIG. 12 even in the case where the difference between the minimum value and the maximum value of the average refractive index of the liquid crystal lenses formed at the time of 3D display is $\Delta n_{\mathit{eff}}$. That is to say, the distribution of the refractive index indicated by the curve G4 does not form a quadratic curve, and therefore, cross talk occurs. The ratio at which cross talk occurs at this time is approximately 1.2% as is clear from the above-described curve G3, and therefore, the quality of 3D display can be improved. In the case where the distance between the second electrodes PX is further increased, however, the ratio at which cross talk occurs is greater than 1.2%, and therefore, the display quality at the time of 3D display is greatly lowered.

In the case where the distance between the second electrodes PX is great, it is possible to make the distribution of the refractive index indicated by the curve G4 form a quadratic curve by increasing the voltage applied to the second electrodes PX and moving the director, which is the direction of the longitudinal axes of the liquid crystal directors LC between D1 and D2. As is clear from the above-described first embodiment, however, the voltage applied across the first electrode CT and the second electrodes PX is great, and therefore, the display quality at the time of 3D display lowers in the case where the voltage applied to the second electrodes PX is increased. Accordingly, it is preferable for the upper limit of the standardized value (s/d) to be 7.0.

In the case where the standardized value (s/d) is 4, that is to say, the distance s between the second electrodes PX is small relative to the thickness d of the liquid crystal layer, as shown in FIG. 13, the distance between a second electrode PX and an adjacent second electrode PX is small. As a result, the applied voltage (driving voltage) that is smaller than the voltage applied to the second electrodes PX in the second liquid crystal display panel LCD2 in the second embodiment as shown in the portion (a) in FIG. 10 makes the distribution of the refractive index indicated by the curve G5 in the portion (b) in FIG. 13 form a quadratic curve. At this time, a sufficient electrical field is not applied to the liquid crystal directors LC in the portions above the second electrodes PX and in the regions in the vicinity thereof. That is to say, as shown in portion (a) in FIG. 13, it is difficult for the director of the liquid crystal directors LC in the regions where the first electrode CT and the second electrodes PX are located so as to overlap as viewed from the top as well as in the regions in the vicinity thereof to be aligned sufficiently in the Z direction, that is to say, in the direction of the thickness of the liquid crystal layer, and thus, the average refractive index in these regions is greatly different from the refractive index ne of the liquid crystal directors LC. As a result, as shown in the portion (b) in FIG. 13, the difference $\Delta n_{\mathit{eff}}$ between the minimum value and the maximum value of the average refractive index of the liquid crystal lenses in the second liquid crystal display panel LCD2 is small, and therefore, liquid crystal lenses having a desired focal distance cannot be formed, and as a result, cross talk occurs. The ratio at which cross talk occurs at this time is approximately 0.25% as is clear from the above-described curve G3, and therefore, the display quality of the 3D images can be improved. In the case where the distance between adjacent second electrodes PX is further smaller and is smaller than 3.5, which is the lower limit value of the standardized value (s/d), however, the ratio at which cross talk occurs is greater than 1.2%, and therefore, the display quality at the time of 3D display lowers greatly. Accordingly, it is preferable for the lower limit value of the standardized value (s/d) to be 3.5.

As a method for solving the above-described problem, it is possible to increase the driving voltage applied across the first electrode CT and the second electrodes PX, for example. In the case where the driving voltage is increased, however, the curve G5 indicating the distribution of the average refractive index does not form a quadratic curve, and thus, the focal distances of the liquid crystal lenses are not consistent in points C and E and in the vicinity of point D in the center portion. As a result, cross talk increases, and the display quality at the time of 3D display greatly lowers.

In order to compensate for the lowering of $\Delta n_{\mathit{eff}}$, it is possible to increase the birefringent index $\Delta n$ or the thickness d of the liquid crystal layer. However, it is difficult for the birefringent index $\Delta n$ to be 0.22 or greater due to the restriction of the liquid crystal material, and it is also very difficult for the thickness d of the liquid crystal layer to be 50 μm or greater as described in the above relating to the first embodiment.

Third Embodiment

Figure 14:
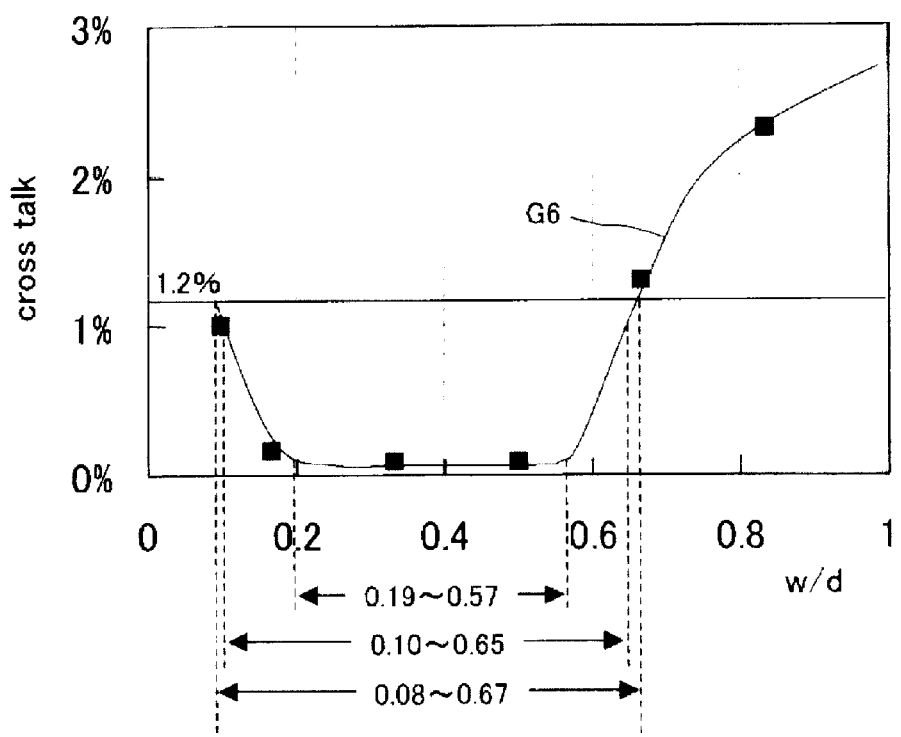
FIG. 14 is a graph showing the ratio at which cross talk occurs relative to the value (W/d) gained by standardizing the width W of the second electrodes PX on the second liquid crystal display panel according to the present invention with the thickness d of the liquid crystal layer.

The display device according to the third embodiment is gained by optimizing the width of the second electrodes provided in the second liquid crystal display panel and has the same structure as the display device according to the first embodiment, excluding the width of the second electrodes PX. FIG. 14 is a graph showing the ratio at which cross talk occurs relative to the value (W/d) gained by standardizing the width W of the second electrodes PX with the thickness d of the liquid crystal layer in the second liquid crystal display panel. In the following, the width W of the second electrodes and the thickness d of the liquid crystal layer are described in reference to FIG. 14. Here, the cross talk in FIG. 14 is calculated according to the same method as in FIG. 11 showing the second embodiment with the standardized value (s/d) being 5.0.

As is clear from the curve G6 in FIG. 14, the ratio at which cross talk occurs greatly changes relative to the standardized value (W/d). That is to say, the ratio at which cross talk occurs is approximately 0%, which makes very good 3D display possible in a range where the standardized value (W/d) satisfies 0.19<W/d<0.57.

In the case where the ratio at which cross talk occurs is approximately 1.2% as well, as described above, the quality of 3D display is not significantly lowered due to the occurrence of cross talk. In particular, it is known that the occurrence of cross talk is very difficult to perceive by the naked eye in the case where the ratio at which cross talk occurs is approximately 1.0%. Accordingly, the width W of the second electrodes PX and the thickness d of the liquid crystal layer in the second liquid crystal display panel LCD2 can be adjusted to a range that satisfies 0.08<W/d<0.67 so that the ratio at which cross talk occurs is 1.2% or less, and thus, a display device in the third embodiment of which the quality of 3D display is improved can be provided. At this time, it is desirable for W/d to satisfy 0.10<W/d<0.65 so that the cross talk is 1% or less, which can further improve the display quality because cross talk of 1% or less is difficult to perceive by the naked eye. It is more desirable for W/d to be in a range that satisfies 0.19<W/d<0.57, which makes the ratio at which cross talk occurs be approximately 0%.

Figure 15:
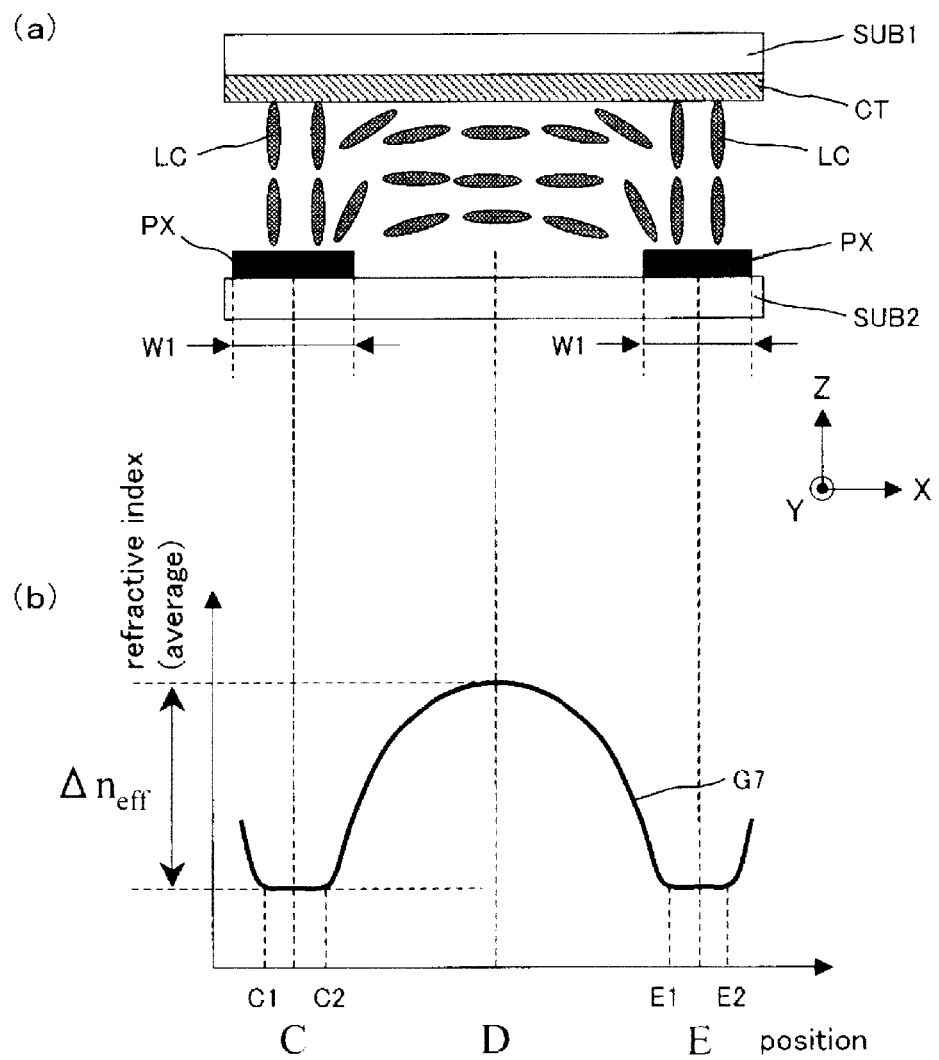
FIG. 15 is a schematic diagram for illustrating the structure of the second liquid crystal display panel where the width of the second electrodes is greater than the upper limit value of the standardized value (W/d)
Figure 16:
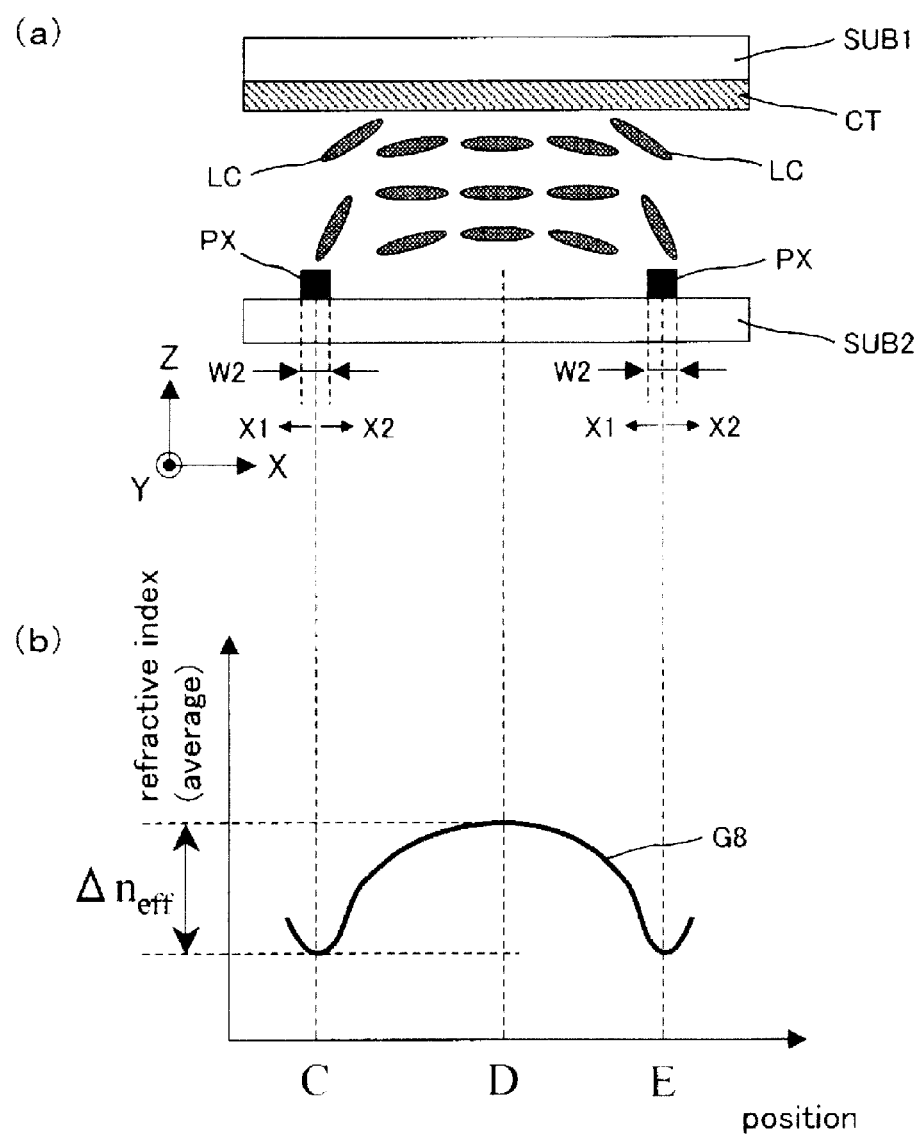
FIG. 16 is a schematic diagram for illustrating the structure of the second liquid crystal display panel where the width of the second electrodes is smaller than the lower limit value of the standardized value (W/d)

FIG. 15 is a schematic diagram for illustrating the structure of the second liquid crystal display panel where the width of the second electrodes PX is greater than the upper limit value of the standardized value (W/d). FIG. 16 is a schematic diagram for illustrating the structure of the second liquid crystal display panel where the width of the second electrodes PX is smaller than the lower limit value of the standardized value (W/d). In the following, the width of the second electrodes PX and the cross talk are described in reference to FIGS. 15 and 16. Here, the portion (a) in FIG. 15 and the portion (a) in FIG. 16 are diagrams showing how the liquid crystal directors are aligned at the time of 3D display, and the portion (b) in FIG. 15 and the portion (b) in FIG. 16 are graphs showing the distribution of the average refractive index in the direction of the thickness (Z direction) relative to the point in the X direction in the second liquid crystal display panel LCD2 shown in the portion (a) in FIG. 15 and the portion (a) in FIG. 16. In addition, the second liquid crystal display panel LCD2 shown in the portion (a) in FIG. 15 and the portion (a) in FIG. 16 has the same structure as the second liquid crystal display panel LCD2 in the first embodiment, except only that the width of the second electrodes PX is different. Furthermore, the average refractive index shown in the portion (b) in FIG. 15 and the portion (b) in FIG. 16 is the average refractive index in the case where the driving voltage of 6 V is applied across the first electrode CT and the second electrodes PX.

Even in the case where the width W1 of the second electrodes PX is greater than the upper limit value of the above-described standardized values (W/d), which is 0.67 μm as shown in the portion (a) in FIG. 15, lines of electric force EF are inclined relative to the Z direction (direction of the thickness) in the regions close to the peripheral portions of the second electrodes PX in the direction of the width as described in the first embodiment. As a result, the liquid crystal directors LC in the regions above the second electrodes PX, that is to say, the regions where the first electrode CT and the second electrodes PX overlap, are aligned so that the director thereof is inclined relative to the Z direction (direction of the thickness), thereby providing lens effects as shown in the portion (b) in FIG. 15. That is to say, the standardized value (s/d) is an optimal value in the second liquid crystal display panel LCD2 shown in the portion (a) in FIG. 15, and therefore, the distribution of the average refractive index forms a quadratic curve in the regions between two second electrodes PX.

In contrast, lines of electric force EF in the Z direction are formed in the regions including the center portion in the direction of the width of the second electrodes PX, that is to say, in the regions that are away from the periphery portions of the second electrodes PX. Therefore, the director of the liquid crystal directors LC is aligned in the Z direction (direction of the thickness). As a result, regions having no lens effects are created in the ranges between points C1 and C2 as well as between points E1 and E2 as shown in the portion (b) in FIG. 15. In the case where the width W1 of the second electrodes PX is great (thick), the regions where the average refractive index is low (regions between points C1 and C2 as well as between points E1 and E2 as shown in the portion (b) in FIG. 15) are great (wide). Thus, in these regions having no lens effects, an image for the right eye emitted from the first liquid crystal display panel LCD1 and an image for the left eye cannot be separated, and the distribution of the refractive index in the second liquid crystal display panel LCD does not form a quadratic curve as a whole. As a result, cross talk is large and the display quality at the time of 3D display lowers.

In the case where the width W2 of the second electrodes PX is smaller than the lower limit value of the standardized value (W/d), which is 3.5 as shown in the portion (a) in FIG. 16, the width in the X direction of the regions where the first electrode CT and the second electrodes PX overlap as viewed from the top is small. Therefore, the liquid crystal directors LC cannot rise sufficiently in the regions where the first electrode CT and the second electrodes PX overlap, which makes it difficult to provide regions where the director of the liquid crystal directors LC is directed in the Z direction (direction of the thickness). As a result, the liquid crystal directors in the periphery portion of the second electrodes PX on the X1 side and the liquid crystal directors in the periphery portion on the X2 side affect other liquid crystal directors, which makes it impossible to sufficiently separate the alignment of the director of the liquid crystal directors LC between the X1 side and the X2 side of the second electrodes PX. Therefore, the difference $\Delta n_{eff}$ between the minimum value and the maximum value of the average refractive index of the liquid crystal lenses formed at the time of 3D display cannot be kept at a sufficient value, which increases cross talk. That is to say, the display quality at the time of 3D display lowers.

Though the standardized value (W/d) of the width of the second electrodes PX relative to the second liquid crystal display panel LCD2 in the first embodiment is described in the third embodiment, this can be applied to the second liquid crystal display panel LCD2 in the second embodiment as well.

Fourth Embodiment

Figure 17A:
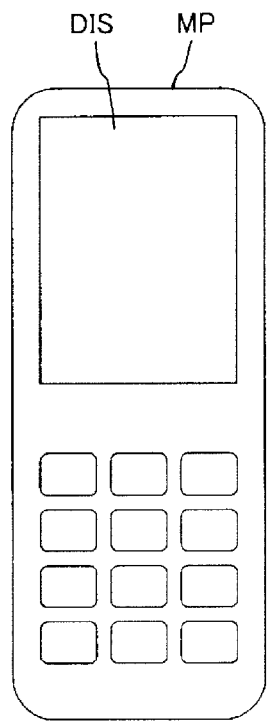
FIGS. 17A and 17B are schematic diagrams for illustrating the structures of information apparatuses according to the fourth embodiment provided with the display device according to the present invention.
Figure 17B:
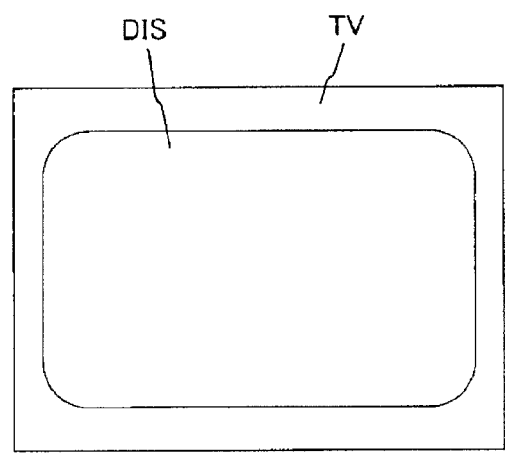

FIGS. 17A and 17B are schematic diagrams for illustrating the structures of information apparatuses according to the fourth embodiment provided with the display device according to the present invention. FIG. 17A shows a case where the display device DIS according to the present invention is applied to a portable information terminal MT, and FIG. 17B shows a case where the display device DIS according to the present invention is applied to a TV set TV.

As shown in FIG. 17A, the display device DIS according to the present invention is applied to a portable information terminal MT, such as a portable game or a portable phone, so that the cross talk at the time of 3D display can be reduced and the image quality (display quality) can be improved. Likewise, in the case where the display device DIS according to the present invention is applied to a TV set TV, the cross talk at the time of 3D display can be reduced, and it is possible to increase the image quality (display quality) at the time of 3D display.

Though the invention made by the present inventor is described on the basis of the typical embodiments of the invention, the present invention is not limited to the above-described embodiments, but various modifications are possible as long as the gist of the invention is not deviated from.

What is claimed is:

1. A display device for displaying an image with a two-dimensional display and a three-dimensional display being switchable, comprising: a first display panel for displaying an image; and a second display panel provided on a display side of said first display panel in order to form a parallax by controlling a refractive index in a form of cylindrical lenses that run in a first direction and are aligned in a second direction that crosses the first direction, characterized in that said second display panel comprises a first substrate having a first electrode in plane form made of a transparent conductive film and a second substrate having second electrodes in linear form that run in the first direction and are aligned in the second direction, said first substrate and said second substrate face each other with a liquid crystal layer in between so as to provide a liquid crystal display panel, a thickness of said liquid crystal layer is equal to or smaller than such a thickness that makes a rotational angle in a direction of a deflection angle of liquid crystal directors in a center portion of said liquid crystal layer in the direction of the thickness be 90° during three-dimensional display, and when intervals between said second electrodes that are aligned in the second direction are s and a thickness of said liquid crystal layer is d, the intervals s between said second electrodes and the thickness d of said liquid crystal layer satisfy $3.5 \leq (s/d) \leq 7$.

2. The display device according to claim 1, characterized in that an alignment film for aligning liquid crystal directors in said liquid crystal layer in a predetermined direction is formed on a liquid crystal layer side of the first substrate and on a liquid crystal layer side of the second substrate, and the direction in which the liquid crystal directors are aligned on the first substrate and the direction in which the liquid crystal directors are aligned on the second substrate are same.

3. The display device according to claim 2, characterized in that an alignment process has been carried out on said alignment films using a rubbing method, and a direction of rubbing of the alignment film on the first substrate and a direction of rubbing of the alignment film on the second substrate are same in order to provide parallel rubbing.

4. The display device according to claim 1, characterized in that said liquid crystal layer has a thickness of 50 μm or less.

5. The display device according to claim 1, characterized in that when a direction in which the liquid crystal directors are aligned on the first substrate and on the second substrate and a direction in which the second electrodes run form an angle $\theta$, said angle $\theta$ satisfies $0 < \theta \leq 10°$, and a direction in which the liquid crystal directors are aligned on the first substrate and on the second substrate and a direction in which said second electrodes run are approximately parallel to each other.

6. The display device according to claim 1, characterized in that the liquid crystal layer in said second display panel is made of liquid crystal with homogeneous alignment where a longitudinal axis of the liquid crystal directors is aligned so as to be approximately parallel to the second display panel.

7. The display device according to claim 1, characterized in that said first display panel is a liquid crystal display panel.

8. A display device for displaying an image with a two-dimensional display and a three-dimensional display being switchable, comprising: a first display panel for displaying an image; and a second display panel provided on a display side of said first display panel in order to form a parallax by controlling a refractive index in a form of cylindrical lenses that run in a first direction and are aligned in a second direction that crosses the first direction, characterized in that said second display panel comprises a first substrate having a first electrode in plane form made of a transparent conductive film and a second substrate having second electrodes in linear form that run in the first direction and are aligned in the second direction, said first substrate and said second substrate face each other with a liquid crystal layer in between so as to provide a liquid crystal display panel, a thickness of said liquid crystal layer is equal to or smaller than such a thickness that makes a rotational angle in a direction of a deflection angle of liquid crystal directors in a center portion of said liquid crystal layer in the direction of the thickness be 90° during three-dimensional display, and when a width of said second electrodes is W and a thickness of said liquid crystal layer is d, the width W between said second electrodes and the thickness d of said liquid crystal layer satisfy $0.08 \leq (W/d) \leq 0.67$.

* * * * *